United States Patent
Long et al.

(10) Patent No.: US 12,461,291 B2
(45) Date of Patent: Nov. 4, 2025

(54) OPTICAL STACK AND HOUSING FOR ELECTRONIC DEVICE

(71) Applicant: 3M INNOVATIVE PROPERTIES COMPANY, St. Paul, MN (US)

(72) Inventors: Fan Long, Guangzhou (CN); Bharat R. Acharya, Woodbury, MN (US); Jing Fei Chen, Shanghai (CN); Huijie Xie, Beijing (CN); Zhe Hu, Jiangsu Province (CN); Bradley L. Givot, St. Paul, MN (US); Carl A. Stover, St. Paul, MN (US); Lin Zhao, Woodbury, MN (US); Gilles J. Benoit, Minneapolis, MN (US); Robert D. Taylor, Stacy, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 321 days.

(21) Appl. No.: 18/006,459

(22) PCT Filed: Aug. 7, 2020

(86) PCT No.: PCT/CN2020/107806
§ 371 (c)(1),
(2) Date: Jan. 23, 2023

(87) PCT Pub. No.: WO2022/027589
PCT Pub. Date: Feb. 10, 2022

(65) Prior Publication Data
US 2023/0266515 A1     Aug. 24, 2023

(51) Int. Cl.
*G02B 5/28* (2006.01)
*B32B 27/30* (2006.01)

(52) U.S. Cl.
CPC .............. *G02B 5/285* (2013.01); *B32B 27/30* (2013.01); *B32B 2307/412* (2013.01); *B32B 2307/42* (2013.01); *B32B 2457/00* (2013.01)

(58) Field of Classification Search
CPC ... G02B 5/285; B32B 27/30; B32B 2307/412; B32B 2307/42; B32B 2457/00
See application file for complete search history.

(56) References Cited

U.S. PATENT DOCUMENTS

| | | | |
|---|---|---|---|
| 5,882,774 A | 3/1999 | Jonza et al. | |
| 5,976,424 A | 11/1999 | Weber et al. | |

(Continued)

FOREIGN PATENT DOCUMENTS

| | | |
|---|---|---|
| CN | 1503916 A | 6/2004 |
| CN | 1265622 A | 10/2004 |

(Continued)

OTHER PUBLICATIONS

International Search Report for PCT Application No. PCT/CN2020/107806, mailed on Apr. 25, 2021, 6 pages.

*Primary Examiner* — Jack Dinh
(74) *Attorney, Agent, or Firm* — Clifton F. Richardson

(57) ABSTRACT

A housing (185) for an electronic device (170) includes an optical film (100) having an optical transmittance for substantially normally incident light having a band edge separating first and second wavelength ranges, where the first wavelength range extends from about 400 nm to about 700 nm and the second wavelength range is at least about 100 nm wide and disposed between about 800 nm and about 1100 nm. For substantially normally incident light, an average optical reflectance of the optical film is greater than about 90% in the first wavelength range, and an average optical transmittance of the optical film is greater than about 80% in the second wavelength range. For at least one frequency in a range of about 0.1 GHz to about 90 GHz and for substan- (Continued)

tially normally incident radiation, the optical film transmits at least about 95% of the incident radiation.

8 Claims, 22 Drawing Sheets

(56) References Cited

U.S. PATENT DOCUMENTS

| | | |
|---|---|---|
| 6,179,948 B1 | 1/2001 | Merrill et al. |
| 6,531,230 B1 | 3/2003 | Weber et al. |
| 6,737,154 B2 | 5/2004 | Jonza et al. |
| 6,783,349 B2 | 8/2004 | Neavin et al. |
| 6,967,778 B1 | 11/2005 | Wheatley et al. |
| 8,083,957 B2 | 12/2011 | Innan et al. |
| 8,354,171 B2 | 1/2013 | Manabe et al. |
| 9,162,406 B2 | 10/2015 | Neavin et al. |
| 9,945,994 B2 | 4/2018 | Hebrink et al. |
| 10,265,895 B2 | 4/2019 | Takano et al. |
| 11,009,637 B2 | 5/2021 | Wheatley et al. |
| 2011/0297087 A1 | 12/2011 | Pagane |
| 2012/0003489 A1 | 1/2012 | Ying |
| 2013/0029164 A1 | 1/2013 | Fujiwara |
| 2013/0034693 A1 | 2/2013 | Fujii et al. |
| 2020/0183065 A1 | 6/2020 | Haag et al. |

FOREIGN PATENT DOCUMENTS

| | | |
|---|---|---|
| CN | 201833636 U | 5/2011 |
| CN | 102099203 B | 1/2013 |
| CN | 109477920 A | 3/2019 |
| CN | 208646485 U | 3/2019 |
| EP | 2372387 A1 | 10/2011 |
| EP | 2409832 A1 | 1/2012 |
| JP | S63151904 A | 6/1988 |
| JP | 2000314807 A | 11/2000 |
| JP | 2011068081 A | 4/2011 |
| JP | 2011079178 A | 4/2011 |
| JP | 2011093296 A | 5/2011 |
| JP | 2011167969 A | 9/2011 |
| JP | 2011218776 A | 11/2011 |
| WO | 2011128973 A1 | 10/2011 |
| WO | 2012057072 A1 | 5/2012 |
| WO | 2012096512 A2 | 7/2012 |
| WO | 2012133234 A1 | 10/2012 |
| WO | 2012139280 A1 | 10/2012 |
| WO | 2019082080 A1 | 5/2019 |
| WO | 2019234560 A1 | 12/2019 |
| WO | 2020053832 A1 | 3/2020 |
| WO | 2020057744 A1 | 3/2020 |
| WO | 2021224703 A1 | 11/2021 |
| WO | 2021224799 A1 | 11/2021 |

OPTICAL STACK AND HOUSING FOR ELECTRONIC DEVICE

CROSS REFERENCE TO RELATED APPLICATIONS

This application is a national stage filing under 35 U.S.C. 371 of PCT/CN2020/107806, filed Aug. 7, 2020, the disclosure of which is incorporated by reference in its entirety herein.

BACKGROUND

Electronic devices typically include a housing that may provide a desired appearance.

SUMMARY

The present description relates generally to optical stacks that may be included in a housing or a cover and to housings for electronic devices. A housing includes an optical film bonded to a rigid optically transparent substrate. In some embodiments, the optical film has a high reflectance (e.g., greater than about 90%) in a visible wavelength range, a high transmittance (e.g., greater than about 80%) in a near infrared wavelength range, a band edge having a large slope (e.g., greater than about 2% per nanometer (nm)) separating the visible and near infrared ranges, and a high transmission (e.g., at least about 95%) for at least at least one frequency in a range of about 0.1 gigahertz (GHz) to about 90 GHz. Optical stacks including the optical film and at least one other layer are also provided. An optical layer included in an optical stack can be a colored layer or an optically diffusive layer, for example.

In some aspects of the present description, a housing for an electronic device is provided. The housing includes an optical film bonded to a rigid optically transparent substrate. An optical transmittance of the optical film for substantially normally incident light and for at least one polarization state includes a band edge separating first and second wavelength ranges, where the first wavelength range extends from about 400 nm to about 700 nm and the second wavelength range is at least about 100 nm wide and disposed between about 800 nm and about 1100 nm. For substantially normally incident light and for the at least one polarization state, an average optical reflectance of the optical film is greater than about 90% in the first wavelength range, and an average optical transmittance of the optical film is greater than about 80% in the second wavelength range. A best linear fit to the band edge correlating the optical transmittance of the optical film to wavelength at least across a wavelength range where the optical transmittance of the optical film increases from about 10% to about 70% has a slope that is greater than about 2%/nm. In some embodiments, for at least one frequency in a range of about 0.1 GHz to about 90 GHz and for substantially normally incident radiation, the optical film transmits at least about 95% of the incident radiation. In some embodiments, for at least one frequency in a range of about 0.1 GHz to about 90 GHz: a dielectric loss tangent of the optical film is less than about 0.02; and for substantially normally incident radiation, the optical film reflects less than about 5% of the incident radiation.

In some aspects of the present description, an optical stack is provided. The optical stack includes an optical film including a plurality of alternating polymeric first and second layers disposed on a skin layer, where each of the first and second layers have an average thickness less than about 250 nm and the skin layer having an average thickness greater than about 2 microns. The first and second layers and the skin layer are formed integrally with one another. An optical transmittance of the optical film for substantially normally incident light and for at least one polarization state includes a band edge separating first and second wavelength ranges, where the first wavelength range extending from about 400 nm to about 700 nm and the second wavelength range is at least about 100 nm wide and disposed between about 800 nm and about 1100 nm. For substantially normally incident light and for the at least one polarization state, an average optical reflectance of the optical film is greater than about 90% in the first wavelength range, and an average optical transmittance of the optical film is greater than about 80% in the second wavelength range. A best linear fit to the band edge correlating the optical transmittance of the optical film to wavelength at least across a wavelength range where the optical transmittance of the optical film increases from about 10% to about 70% has a slope that is greater than about 2%/nm. The optical stack includes an optical layer disposed on and substantially coextensive with the optical film, such that for substantially normally incident light and for the at least one polarization state, an optical absorption of the optical layer is at least 20% higher for a first wavelength in the first wavelength range than for a second wavelength in the first wavelength range. The optical stack has an optical transmittance for substantially normally incident light and for the at least one polarization state of greater than about 60% for a third wavelength in the second wavelength range.

In some aspects of the present description, an optical stack including an optical film bonded to a rigid optically transparent substrate is provided. The optical film includes a plurality of polymeric layers arranged along at least a portion of a thickness of the optical film and sequentially numbered from 1 to N, N an integer greater than about 100, the plurality of polymeric layers comprising a polymeric end layer at each end thereof, a plot of an average layer thickness versus a layer number of the plurality of polymeric layers including a first knee region separating a left region comprising at least N1 sequentially arranged polymeric layers, N1 an integer greater than about 50, where the polymeric layers have lower layer numbers, from a middle region comprising at least N2 sequentially arranged polymeric layers, N2 an integer greater than about 10, where the polymeric layers have higher layer numbers, such that a linear fit to the at least N1 sequentially arranged polymeric layers in the left region has a positive linear slope having a magnitude of greater than about 0.04 nm per layer number with an r-squared value of greater than about 0.8, and a linear fit to the at least N2 sequentially arranged polymeric layers in the middle region has a negative linear slope having a magnitude of greater than about 0.05 nm per layer number with an r-squared value of greater than about 0.8.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Electronic devices typically include a housing. The housing is typically the outermost layer of the device and is typically visible to a user of the device. In some cases, it is desired that the housing be transmissive to radio waves (e.g., a cell phone signal). A metallic appearance is sometimes desired. For example, it may be desired that a cover of an electronic device have a metallic appearance or that a logo or emblem on an electronic device have a metallic appearance. However, metals are not transmissive to radio waves. Housings and optical stacks described herein can, in some embodiments, provide a metallic appearance while being substantially transmissive to radio waves (e.g., at 5G wavelengths). For example, a housing can include a back cover including a glass layer and an optical film bonded to the glass layer where the optical film can have a high specular reflection resulting in a metallic appearance. In some embodiments, an electronic device, such as a smart phone, includes infrared sensors/transmitters for one or more of proximity detection (e.g., for camera autofocus), light detection and ranging (Lidar), or temperature detection. In some embodiments, the optical film is substantially transmissive to the near infrared wavelengths used by such sensors/transmitters while having a high reflectivity throughout a visible wavelength range of at least 450 nm to 650 nm or 400 nm to 700 nm.

Figure 1:
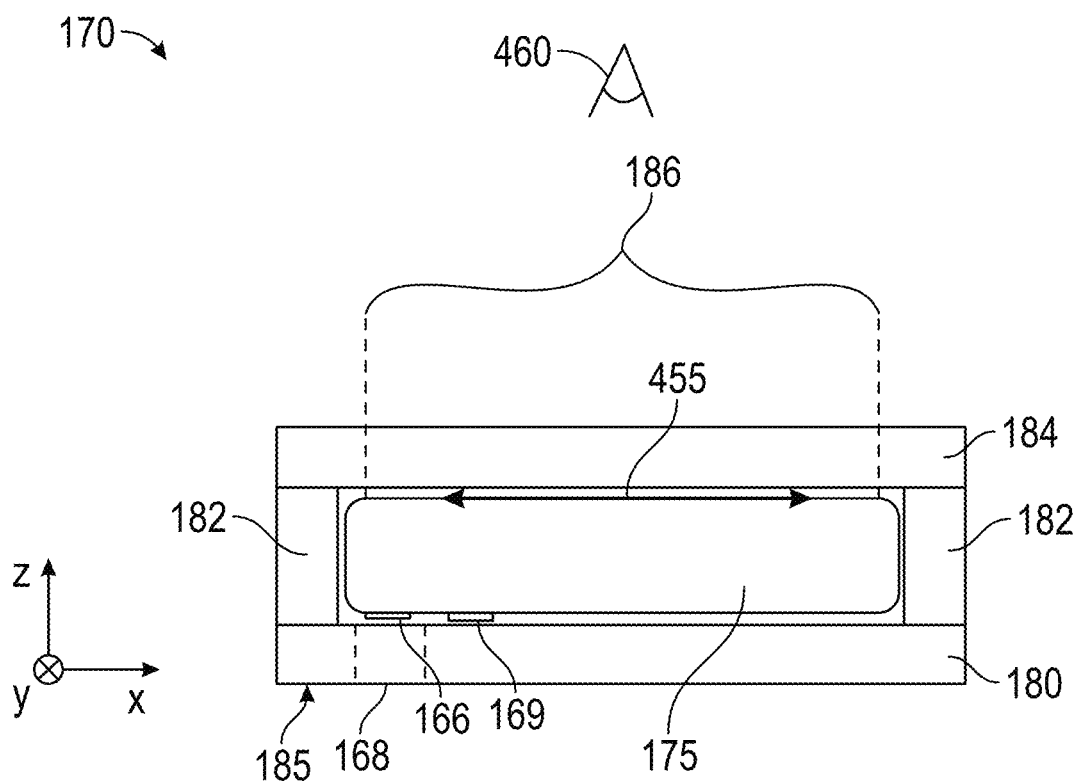
FIG. 1 is a schematic cross-sectional view of an illustrative electronic device.

FIG. 1 is a schematic cross-sectional view of an electronic device 170 according to some embodiments. The illustrated electronic device 170 includes a display component 175 having a light output area 186 for displaying an image 455 to a viewer 460. The electronic device 170 includes front and back covers 184 and 180 and a frame 182 extending between the front and back covers 184 and 180. The front cover 184 is disposed on a front side of the electronic device 170 facing the viewer 460 and the back cover is on an opposite back side of the electronic device 170 facing away from the viewer 460. The housing 185 of the electronic device 170 includes the back cover 180 and the frame 182 and may optionally be considered to include the front cover 184. In some embodiments, the housing can be a single back cover with a curved three dimensional design. As described further elsewhere herein, the housing 185 includes an optical film which can be include in the back cover 180 and/or the frame 182 and/or a portion of the front cover 184. It is typically preferred that the optical film does not substantially overlay the light output area 186 in embodiments where the electronic device has a light output area. For example, the optical film may cover less than 10% of the light output area 186 or, in some embodiments, the optical film does not cover any of the light output area 186. The optical film may be a mirror film included to provide a desired appearance to the housing 185, for example, and it would typically be undesired for such a film to cover a portion of the light output area 186.

In some embodiments, the electronic device includes a visible light element 166 adapted to receive or transmit light. For example, the visible light element 166 may include a camera, a flash for a camera, or both. In some embodiments, the housing 185 includes a window 168 for allowing visible light transmission into or out of the housing. The optical film typically does not substantially overlay the window 168. In some embodiments, the electronic device includes an infrared (IR) light element 169 adapted to receive or transmit infrared light. The infrared light is typically a near infrared light (wavelengths from about 700 nm to about 2000 nm). Near infrared (NIR) light of interest typical have wavelengths of about 800 nm to about 1500 nm or to about 1300 nm, or to about 1200 nm, or to about 1100 nm, for example. In some embodiments, the housing, or the portion of the housing covering IR light element 169 is substantially transparent to the NIR wavelengths. In some embodiments, the optical film including in the housing 185 covers or substantially covers the IR light element 169. In some embodiments, the optical film is substantially transparent to the NIR wavelengths.

In some embodiments, the electronic device 170 is configured to transmit and/or receive radiation at an operating frequency in a range of about 0.1 GHz to about 90 GHz. For example, the electronic device 170 may be a 5G cell phone. In such embodiments, it is typically desired that at least a portion (e.g., the back cover 180) of the housing 185 is substantially transmissive at the operating frequency. Therefore, it is typically desired that the optical film is transmissive at the operating frequency. In some embodiments, the inside of the housing may support signal transmitters and receivers in the form of antennas that are patterned or otherwise placed on the inside of the back cover.

Figure 2:
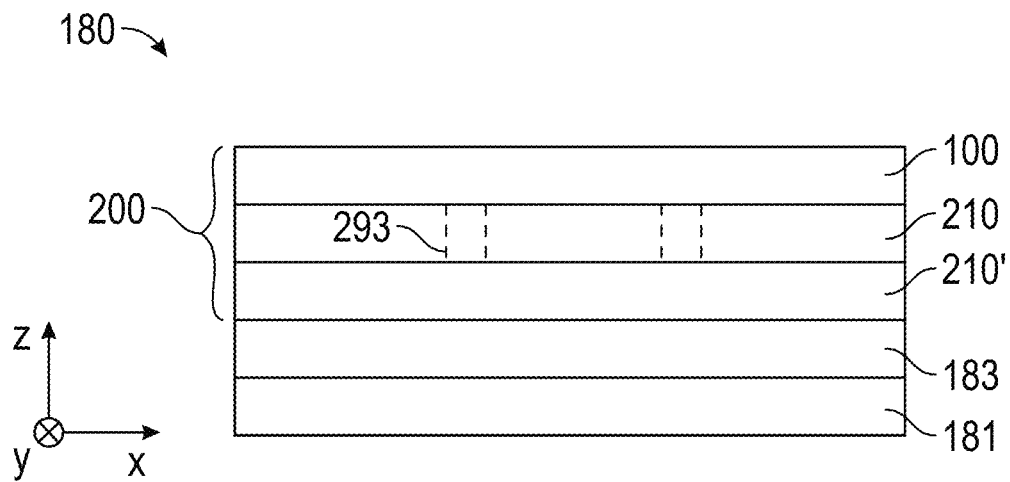
FIG. 2 is a schematic cross-sectional view of an illustrative back cover.

FIG. 2 is a schematic cross-sectional view of the back cover 180 according to some embodiments. The back cover 180 includes a rigid optically transparent substrate 181. A "rigid" substrate is a substrate sufficiently rigid that when held horizontally by an edge (a short edge in the case of a substantially rectangular substrate) of the substrate, the substrate does not substantially deflect (e.g., a vertical deflection is less than about ¼ of the length of a long edge). For example, a glass sheet and a sufficiently thick polymeric (e.g., polycarbonate, polymethylmethacrylate or blends thereof) sheet are typically rigid substrates, while a flexible film is not. In some embodiments, the substrate 181 is a glass substrate having an average thickness of at least 0.5 mm. An "optically transparent" substrate is a substrate having an average optical transmittance for substantially normally incident unpolarized light of greater than 50 percent. In some embodiments, this average optical transmittance is greater than about 60 percent, or greater than about 70 percent, or greater than about 80 percent. The back cover 180 includes an optical film 100 disposed on the substrate 181. In some embodiments, the optical film 100 is substantially coextensive with the substrate 181. For example, the optical film 100 may cover at least about 80 percent of an area of the substrate 181. In some embodiments, the optical film 100 covers all of the substrate 181 except optionally edge portions (e.g., near the frame 182). The optical film 100 typically faces the display component 175 while the substrate 181 faces away from the display component 175. For example, the back cover 180 can be oriented as indicated by the x-y-z coordinate system of FIGS. 1-2.

In the illustrated embodiment, the back cover 180 includes optional adhesive layer 183, optional optical layer 210, and optional optical layer 210'. Another adhesive layer can optionally be included between the optical layer 210 and the optical film 100, for example. In some embodiments, the optical layer 210 and/or 210' is a coating applied to the substrate 181 or to the optical film 100. The optical layer 210 or 210' can be a color filter such as a dyed or pigmented layer or an ink coating, for example, or can be an optical diffuser, for example. Suitable dyes or pigments for achieving a desired color are known in the art. In some embodiments, one of the optical layers 210 and 210' is a color filter and the other is an optical diffuser. For example, optical layer 210' can be an optical diffuser and optical layer 210 can be a color filter, or visa versa. A color filter may be included to give the housing a colored metallic look, for example, and an optically diffusive layer may be included to tailor the appearance of the housing. In some embodiments, one or both of the optical layers 210, 210' can be a patterned layer (e.g., a patterned optically absorptive layer). For example, the optical layer can be an ink layer blocking portions of the optical film 100 and leaving other portions uncovered. The ink layer can have an optical absorption of at least 20% for at least one visible wavelength (e.g., a wavelength in a range of 400 nm to 700 nm). Optional uncovered portions 293 are schematically illustrated in FIG. 2 for layer 210. The uncovered portions 293 can define a logo or an emblem, for example. In some embodiments, one of the optical layers 210, 210' is omitted. When the optical layer 210 and/or 210' is included, the optical film 100 with the optical layer 210 and/or 210' may be described as an optical stack 200. The back cover 180 may optionally include additional optical layer(s) disposed on the optical film 100 opposite the substrate 181. Such additional optical layer(s), if included, may be considered to be part of optical stack 200. Other optical layers that can be included in optical stack 200 include textured layers, for example.

Alternatively, the back cover 180 can be considered to be an optical stack which may be used in other applications. For example, the optical stack can be used as a front cover for non-display devices or systems. The optical stack includes an optical film 100 bonded to a rigid optically transparent substrate 181, where the optical film can be any optical film described herein. In some embodiments, the optical film 100 is a multilayer optical film including alternating polymeric layers. Such multilayer optical films can be used to provide desired reflection and transmission in desired wavelength ranges by suitable selection of layer thicknesses. Multilayer optical films and methods of making multilayer optical films are described in U.S. Pat. No. 5,882,774 (Jonza et al.); 6,179,948 (Merrill et al.); 6,783,349 (Neavin et al.); 6,967,778 (Wheatley et al.); and 9,162,406 (Neavin et al.), for example. Layer thickness profiles providing a high reflectivity in a visible range, a high transmission in a near infrared range, and a sharp band edge therebetween are described further elsewhere herein.

Figure 3:
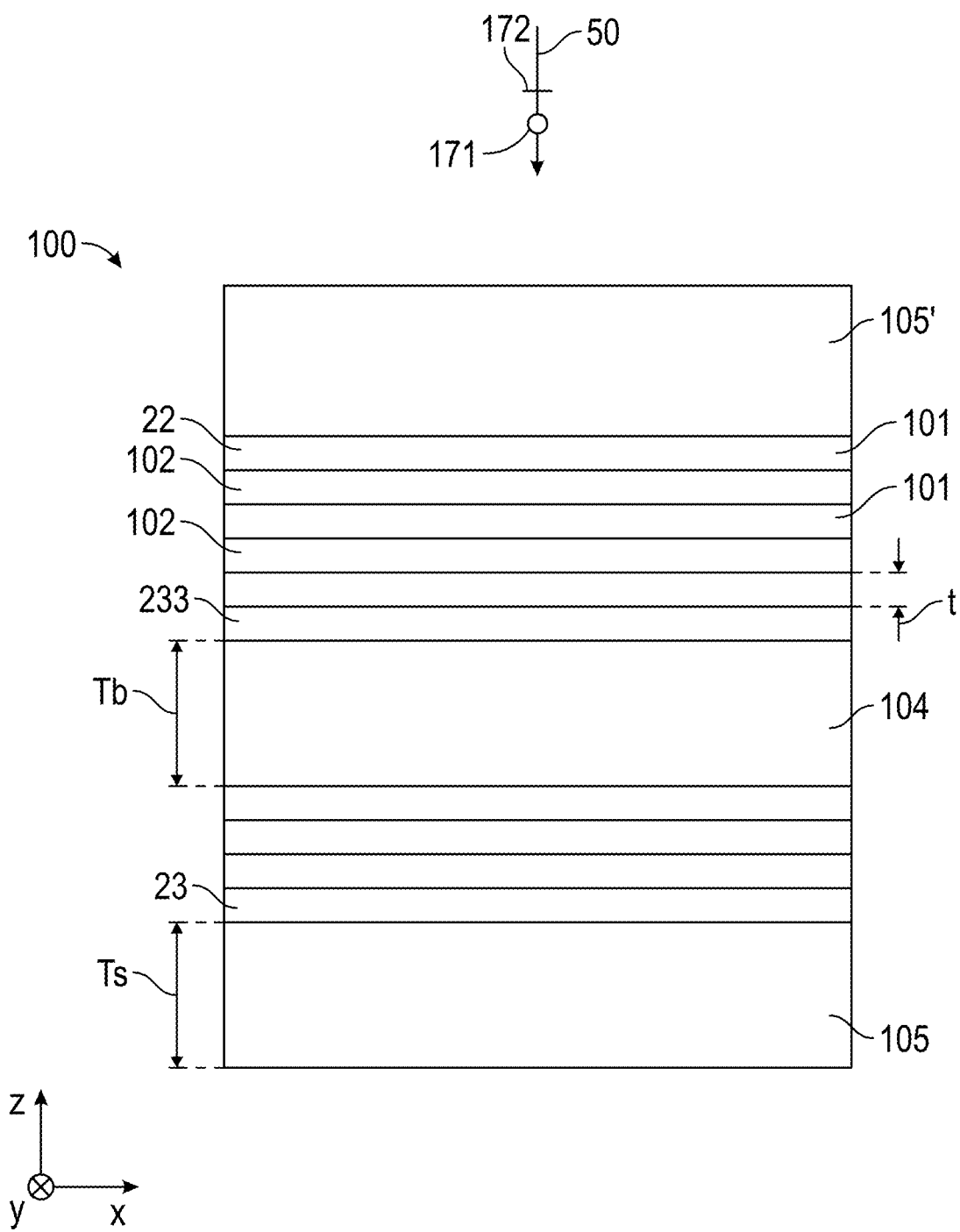
FIG. 3 is a schematic cross-sectional view of an illustrative optical film.

FIG. 3 is a schematic cross-sectional view of an illustrative optical film 100 including a plurality of alternating polymeric first and second layers 101 and 102. In the illustrated embodiment, the plurality of alternating first and second layers 101 and 102 is disposed on a skin layer 105 and/or 105'. One or both of the skin layers 105, 105' may optionally be omitted. The plurality of alternating first and second layers 101 and 102 reflect and transmit light primarily by optical interference and may be referred to as optical layers or interference layers. The optical film 100 can include a single packet of first and second layers 101 and 102, which may be referred to as interference layers, or may include two or more packets where adjacent packets are separated by an optically thick layer 104 which may have an average thickness Tb greater than about 500 nm or greater than about 1 micron. An optical film, or the interference layers of an optical film, may be described as reflecting and transmitting light primarily by optical interference when the reflectance and transmittance can be reasonably described by optical interference or reasonably accurately modeled as resulting from optical interference. Adjacent pairs of interference layers having differing refractive indices reflect light by optical interference when the pair has a combined optical thickness (refractive index times physical thickness) of ½ the wavelength of the light. The refractive index used in determining the optical thickness can be a fixed reference wavelength (e.g., 532 nm or 633 nm). Interference layers typically have a physical thickness of less than about 500 nanometers, or less than about 300 nm, or less than about 250 nm. Skin layers typically have an optical thickness too large to reflect and transmit light primarily by optical interference and may be referred to as non-interference layers or non-optical layers or optically thick layers. However, Fresnel reflections from a major surface (e.g., the outermost major surface) of a skin layer can affect the transmission spectrum of the optical film as described further elsewhere herein.

The thicknesses of the alternating first and second layers can be selected to give a desired reflection band and a thickness profile can be selected to include a large number of layer pairs having an optical thickness corresponding to the band edge as described further elsewhere herein. An appropriate thickness of the skin layer(s) can be determined by optical modeling, for example, where the transmission spectra can be determined for a range of skin thicknesses. A skin thickness can be chosen which results in reduced optical ringing, for example.

The average thickness t of an interference layer is indicated. In some embodiments, each of the first and second layers have an average thickness less than about 500 nm, or less than about 250 nm, or less than about 200 nm, or less than about 180 nm, or less than about 200 nm, or in a range of 20 nm to 250 nm, or in a range of 25 nm to 200 nm, or in a range of about 30 nm to about 180 nm. The average thickness refers to the unweighted average of the thickness over an area of the optical film 100. The thickness of a layer may be substantially constant (e.g., varying by no more than 10%, or no more than 5%, or no more than 3%) so that the average thickness is the substantially constant thickness of the layer. In some embodiments, the skin layer 105, 105' has an average thickness Ts greater than about 2 microns, or greater than about 3 microns, or greater than about 4 microns, or greater than about 5 microns, or greater than about 6 microns, or greater than about 7 microns. In some embodiments, the skin layer 105, 105' has a thickness of no more than about 30 microns, or no more than about 20 microns, or no more than about 15 microns, or no more than about 10 microns. In some embodiments, the skin layer 105, 105' has an average thickness in a range of about 2 microns to about 15 microns, or in a range of about 3 microns to about 10 microns, for example. In some embodiments, the skin layer 105' has an average thickness within about 20%, or within about 15%, or within about 10% of the average thickness of the skin layer 105.

As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film having each of the layers, followed by orienting the cast film) rather than manufactured separately and then subsequently joined. In some embodiments, at least the first and second layers 101 and 102 and the skin layer 105 are formed integrally with one another. In some embodiments, the first and second layers 101 and 102, the first skin layer 105, and an opposite second skin layer 105' are formed integrally with one another.

The optical film 100 can include many more layers 101 and 102 than schematically illustrated in FIG. 3. In some embodiments, the optical film 100 includes a plurality of alternating polymeric layers 101 and 102 numbering at least 30 in total and transmitting and reflecting light primarily by optical interference. In some embodiments, optical film 100 includes a plurality of alternating polymeric first and second layers 101 and 102 numbering between 50 and 800, or between 400 and 800, or between 500 and 800, inclusive. In some embodiments, the only layers in the optical film having a thickness less than about 500 nm, or less than about 250 nm, are the first and second layers 101 and 102, and a total number of the alternating polymeric first and second layers 101 and 102 is in a range of 50 to 800, or in a range of 400 to 800, or in a range of 500 to 800.

The optical films of the present description can be made using any suitable light-transmissive materials, but in many cases, it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 100%, i.e., R+T≈100%, or R≈100%−T. Suitable materials for the alternating first and second layers 101 and 102 and for the skin layer 105, 105' and for the layer 104 include, for example, polyethylene naphthalate (PEN), copolymers containing PEN and polyesters (e.g., polyethylene terephthalate (PET) or dibenzoic acid), glycol modified polyethylene terephthalate, polycarbonate (PC), poly(methyl methacrylate) (PMMA), or blends of these classes of materials. In some embodiments, the first layers 101 include PEN and the second layers 102 include PMMA. In some embodiments, the first layers 101 include PEN and the second layers 102 includes a polymer blend of glycol modified copolyester and polycarbonate. Such polymers have low absorption in the visible and NIR wavelength ranges of interest and in the 5G frequency ranges of interest.

The optical transmission and reflection properties of the optical film may be specified for substantially normally incident light. Substantially normally incident light is light sufficiently close to normally incident on the optical film that the transmittance and reflectance of substantially normally incident light differs negligibly from that of light normally incident on the optical film. Substantially normally incident light may, in some embodiments, be within 20 degrees, or within 10 degrees, or within 5 degrees of normally incident, or may be normally incident or nominally normally incident. The transmission and reflection properties of the optical film may alternatively, or in addition, be specified for (e.g., radio frequency) radiation substantially normally incident on the optical film. Substantially normally incident radiation can be understood to mean that a line from a radiation source facing the optical film to the optical film is substantially normal to the optical film. Substantially normally incident light or radiation 50 is schematically illustrated in FIG. 3. Radio frequency radiation can be assumed to be unpolarized, except where indicated differently. The optical transmission and reflection properties of the optical film can be specified for at least one polarization state. For example, the optical properties may be specified for a first polarizations state 171, or may be specified for orthogonal first and second polarization states 171 and 172.

In some embodiments, the optical film 100 is reflective in a first wavelength range (e.g., extending at least from about 430 nm to about 680 nm or extending from about 400 nm to about 700 nm) for at least one polarization state. For example, in some embodiments, for substantially normally incident light and for the at least one polarization state, an average optical reflectance of the optical film is greater than about 90%, or greater than about 95%, or greater than about 97%, or greater than about 98% in the first wavelength range. An average optical transmittance (resp., optical reflectance) is the unweighted mean of the optical transmittance (resp., optical reflectance) in a specified wavelength range. In some embodiments, for substantially normally incident light and for the at least one polarization state, an optical reflectance of the optical film is greater than about 90%, or greater than about 95%, or greater than about 97%, or greater than about 98% for each wavelength in the first wavelength range.

A high reflectance can be achieved by increasing the number of interference layers reflecting light in a given wavelength range. Optical films having a high reflectance are described in International Appl. Pub. No. WO 2020/053832 (Fabick et al.) and in U.S. Pat. Appl. Pub. No. 2020/0183065 (Haag et al.). In some embodiments, the optical film 100 is transmissive in a second wavelength range (e.g., extending at least from about 1000 nm to about 1200 nm; or being at least 100 nm wide and disposed between about 800 nm and about 1200 nm or between about 800 nm and about 1100 nm; or being at least about 250 nm wide and disposed between about 800 nm and about 1300 nm or between about 800 nm and about 1200 nm). For example, in some embodiments, for substantially normally incident light and for the at least one polarization state, an average optical transmittance of the optical film is greater than about 75%, or greater than about 80%, or greater than about 85%.

Figure 4:
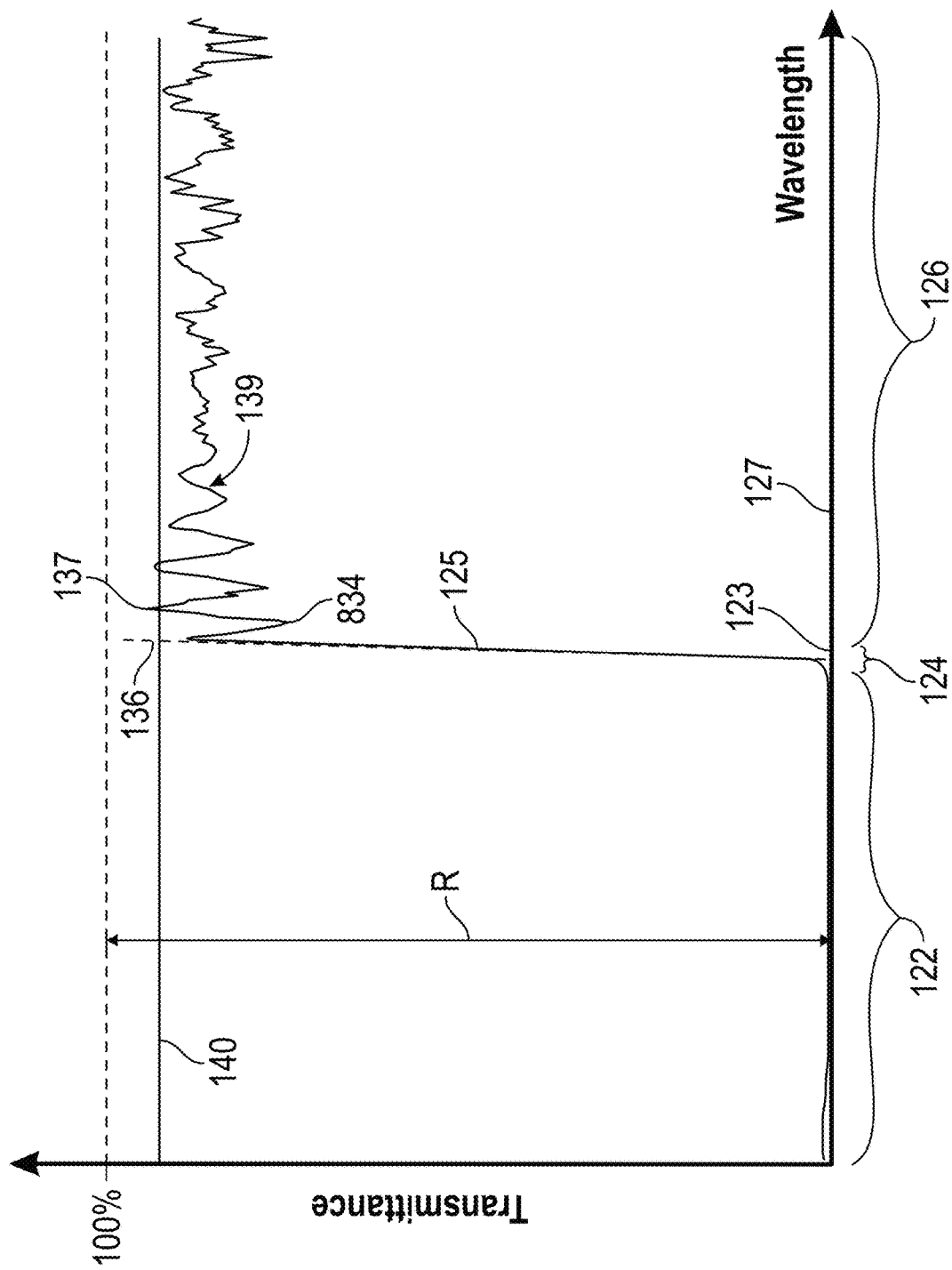
FIG. 4 is a schematic plot of the optical transmittance of an illustrative optical film.

FIG. 4 is a schematic plot of an optical transmittance 139 of an optical film for substantially normally incident light, according to some embodiments. The optical transmittance of the optical film includes a band edge 125 separating first and second wavelength ranges 122 and 126. A band edge region 124 includes at least a wavelength range where the optical transmittance increases from about 10% to about 70% with increasing wavelength. In some embodiments, the optical transmittance of the optical film for substantially normally incident light within the band edge region 124 increases monotonically at least from about 10% to about 70%, or at least from about 10% to about 75%, or at least from about 10% to about 80%, or at least from about 5% to about 80% with increasing wavelength. In some embodiments, the first wavelength range 122 extends from at least about 450 nm to about 650 nm, or extends from about 400 nm to about 700 nm. In some embodiments, the second wavelength range 126 extends from about 950 nm to about 1300 nm or to about 1200 nm, or is at least about 100 nm wide and disposed between about 800 nm and 1100 nm (e.g., the range from about 1000 nm to about 1100 nm), or is at least about 200 nm wide and disposed between about 800 nm and about 1300 nm or between about 800 nm and about 1200 nm. In some embodiments, each of the first and second wavelength ranges is at least 250 nm wide, or at least 300 nm wide. In some embodiments, the band edge region 124 is no more than 30 nm wide, or no more than 20 nm wide, or no more than 15 nm wide. The reflectance R for the at least one polarization state is schematically illustrated as approximately 100% minus the optical transmittance 139.

In some embodiments, a difference between maximum 137 and minimum 834 values of the optical transmittance of the optical film in the second wavelength range 126 is less than about 30%, or less than about 25%, or less than about 22% (for example, the maximum value 137 of the optical transmittance in the second wavelength range 126 may be about 95% and the minimum value 834 may be about 75% so that the difference is about 20%).

In some embodiments, an electronic device includes a housing including the optical film and includes an infrared light element 169 adapted to emit and/or receive light at an infrared wavelength 127. In some cases, it is desired that the optical film be transmissive to the infrared wavelength 127 and to be reflective for wavelengths close to (e.g., about 50 nm less than) the infrared wavelength 127. In some embodiments, at an infrared wavelength 127, the optical film transmits at least 70% of substantially normally incident light, and at a first wavelength 123 disposed between the first wavelength range 122 and the infrared wavelength 127, the optical film transmits between 40% and 60% of substantially normally incident light. In some embodiments, the first wavelength 123 is within about 60 nm, or about 50 nm, or about 40 nm, or about 30 nm, or about 20 nm of the infrared wavelength 127.

The optical transmittance 139 can be for at least one polarization state. For example, the at least one polarization state include orthogonal first (171) and second (172) polarization states. In this case, the optical transmittance 139 is the transmittance for each of the first and second polarization states. In some embodiments, the at least one polarization state includes a first polarization state 171 and for substantially normally incident light having a second polarization state 172 orthogonal to the first polarization state 171, an average optical transmittance of the optical film is greater than about 80% in each of the first and second wavelength ranges. For example, the optical transmittance in the second polarization state may be the transmittance 140 schematically illustrated in FIG. 4.

In some embodiments, a best linear fit to the band edge correlating the optical transmittance to wavelength at least across a wavelength range (e.g., band edge region 124) where the optical transmittance increases from about 10% to about 70% has a slope that is greater than about 2%/nm, or greater than about 3%/nm, or greater than about 4%/nm, or greater than about 5%/nm. A best linear fit 136 is schematically illustrated in FIG. 4. The best linear fit 136 can be determined as a linear least squares fit to the transmittance as a function of wavelengths at least across a wavelength range where the transmittance increases from about 10% to about 70% (e.g., across a wavelength range where the transmittance increases from about 10% to about 70%, or from about 10% to about 75%, or from about 10% to about 80%). In some embodiments, the best linear fit to the band edge correlating the optical transmittance to wavelength is at least across a wavelength range where the optical transmittance increases from about 10% to about 75%, or from about 10% to about 80%. In some embodiments, a best linear fit to the band edge correlating the optical transmittance to wavelength at least across a wavelength range where the optical transmittance increases from about 10% to about 75% has a slope that is greater than about 2%/nm, or greater than about 3%/nm, or greater than about 4%/nm, or greater than about 5%/nm. In some embodiments, a best linear fit to the band edge correlating the optical transmittance to wavelength at least across a wavelength range where the optical transmittance increases from about 10% to about 80% has a slope that is greater than about 2%/nm, or greater than about 3%/nm, or greater than about 4%/nm, or greater than about 5%/nm.

The band edge slope can be adjusted by suitable selection of layer thickness profiles. The layer thickness profiles, in some embodiments in combination with skin thicknesses selected to reduce ringing, for example, can be also selected to provide the desired transmission spectra. Optical films having sharp band edges are known in the art and are described in U.S. Pat. No. 6,967,778 (Wheatley et al.) and in International Appl. Pub. No. WO 2020/053832 (Fabick et al.), for example. Related optical films are described in co-pending U.S. Appl. No. 63/021,743 filed on May 8, 2020 and titled "Optical Film".

Figure 5:
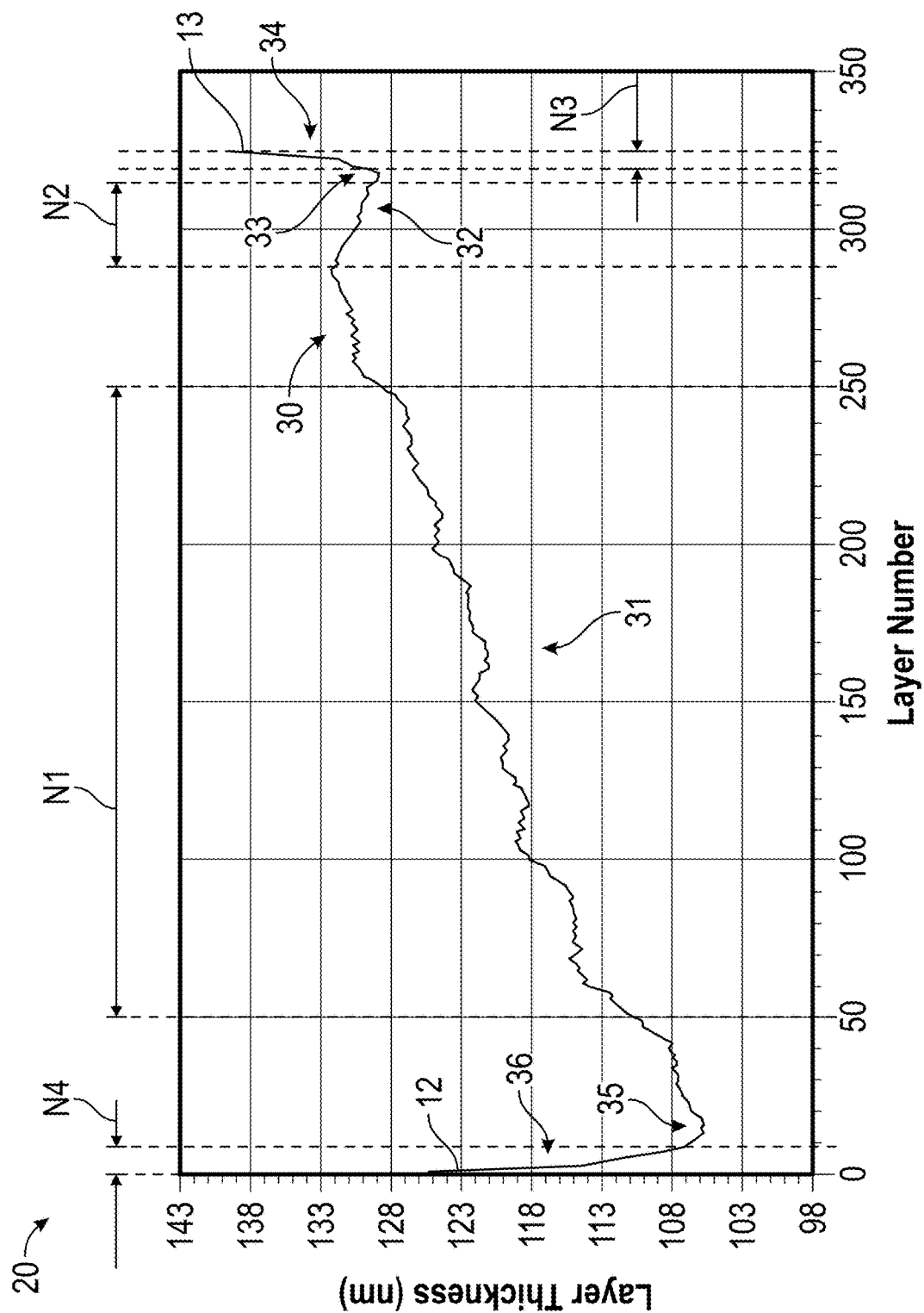
FIG. 5 is an illustrative plot of average layer thickness versus layer number for a plurality of polymeric layers where the plot has a knee region separating a middle region from a right region.
Figure 6:
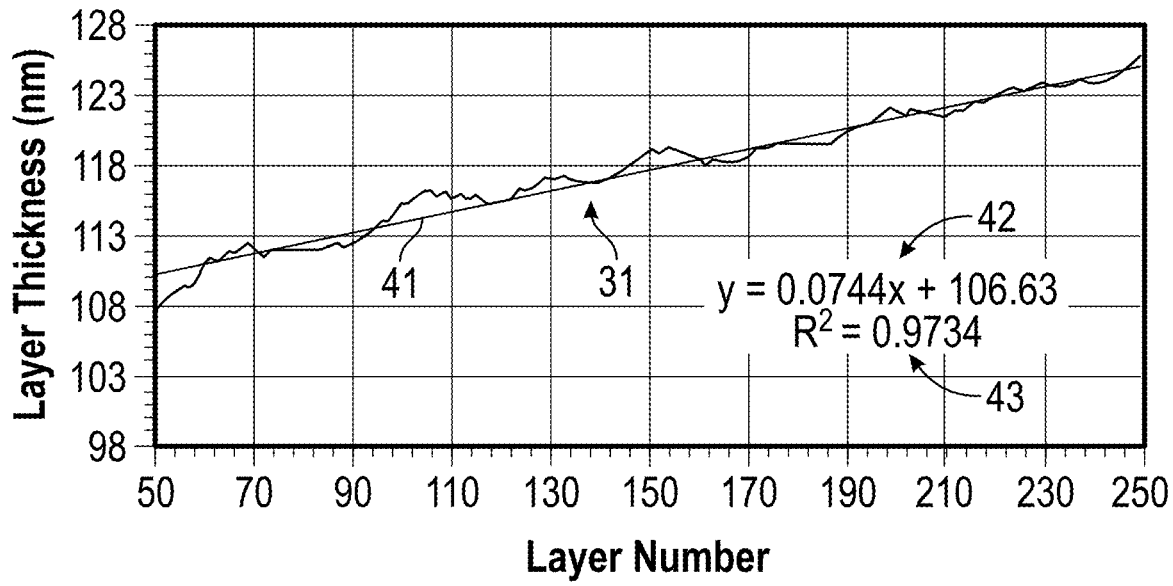
FIGS. 6-9 show portions of the plot of FIG. 5.
Figure 7:
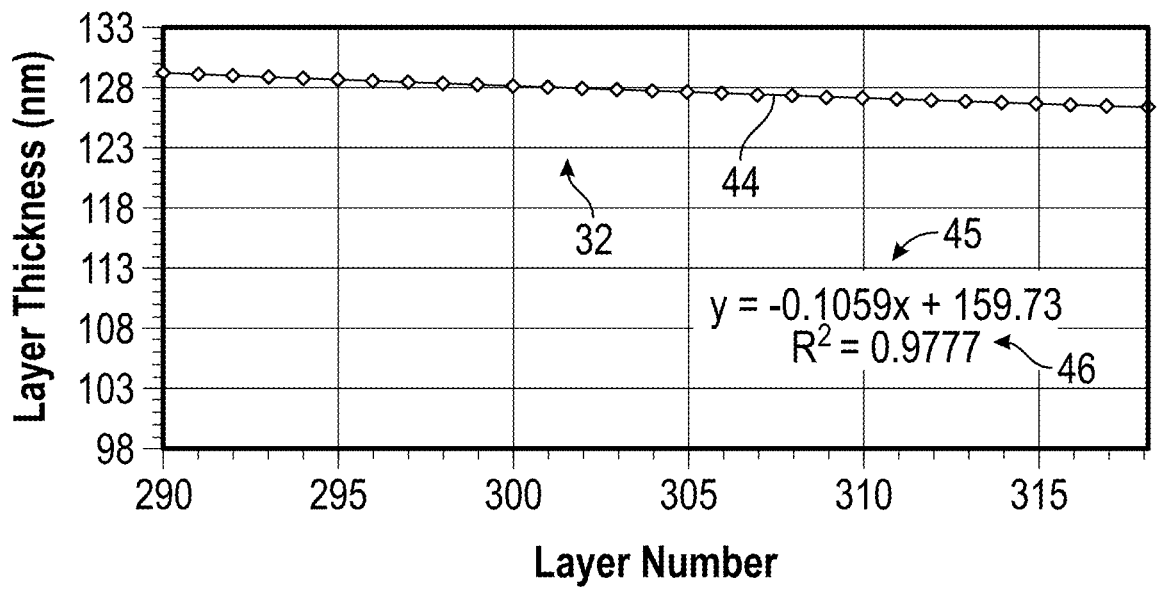
Figure 8:
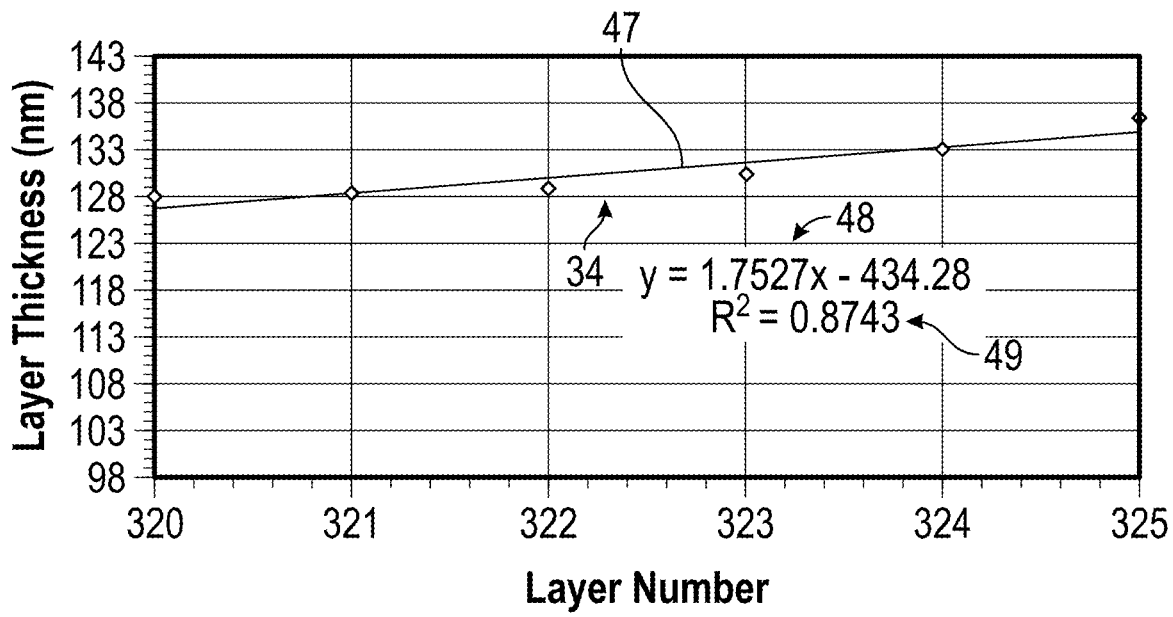
Figure 9:
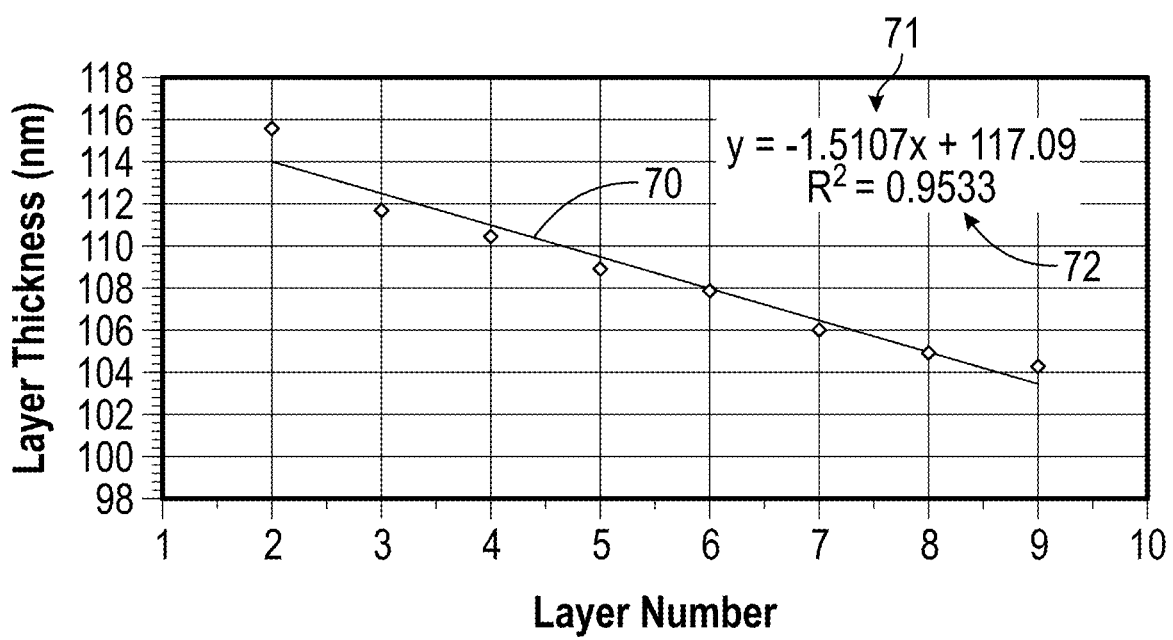

FIG. 5 is a plot 20 of average layer thickness versus layer number for a plurality of polymeric layers 101, 102, according to some embodiments. The thickness profile can be for a plurality of polymeric layers 101, 102 in an entire film or in a packet of a film. FIGS. 6-9 show portions of the plot of FIG. 5. The layer thicknesses profiles can be selected through suitable feedblock design and processing. For example, the axial rod heater power levels in the multilayer feedblock described in U.S. Pat. No. 6,783,349 (Neavin et al.) can be used to control the layer thickness profile.

The average layer thicknesses can be measured using an Atomic Force Microscope (AFM). To reduce the error of the measurement, the average thickness of a layer can be determined as a moving average. The layers can be numbered from the thinnest layer to the thickest layer and the moving average can average over 20 layers including 10 layers with lower layer numbers, the specified layer, and 9 layers with higher layer numbers. Near the ends of the profile, fewer layers are used in the moving average since fewer layers before or after the specified layer are available. For example, for a film or packet with 325 layers, the average thickness of layer 1 will be the average thickness of layers 1 to 10, the average thickness of layer 2 will be the average thickness of layers 1 to 11, the average thickness of layer 101 will be the average thickness of layers 91 to 110, the average thickness of layer 325 will be the average thickness of layers 315 to 325, and the average thickness of layer 324 will be the average thickness of layers 314 to 325.

In some embodiments, an optical film 100 includes a plurality of polymeric layers 101, 102 arranged along at least a portion of a thickness (z-direction) of the optical film and sequentially numbered from 1 to N, where N is an integer greater than about 100. The plurality of polymeric layers 101, 102 include a polymeric end layer 22, 23 or 22, 223 at each end thereof (see, e.g., FIG. 3). In some embodiments, the polymeric end layers 22, 23 and each layer 101, 102 therebetween has an average thickness less than about 300 nm. The optical film can optionally include at least one layer 104 (see, e.g., FIG. 3) between the polymeric end layers 22, 23 having an average thickness Tb greater than about 500 nanometers or in any of the thickness ranges described elsewhere herein. Any such thick layer(s) that may be included in the optical film may be considered separate layer(s) that are not included in the plurality of polymeric layers 101, 102 and may be omitted in the sequential numbering from 1 to N. The numbering from 1 to N can alternatively refer to layers in a single packet. For example, the layers sequentially numbered from 1 to N can be the layers of a first plurality of polymeric layers starting with end layer 223 and ending with end layer 22, or starting with end layer 22 and ending with end layer 223. In some embodiments, the polymeric end layers 22, 223 and each layer 101, 102 therebetween has an average thickness less than about 300 nm.

In some embodiments, a plot 20 of an average layer thickness t versus a layer number of the plurality of polymeric layers 101, 102 includes a first knee region 30 separating a left region 31 including at least N1 sequentially arranged polymeric layers where the polymeric layers have lower layer numbers, from a middle region 32 including at least N2 sequentially arranged polymeric layers where the polymeric layers have higher layer numbers, such that a linear fit 41 (see, e.g., FIG. 6) to the at least N1 sequentially arranged polymeric layers in the left region has a positive linear slope 42 having a magnitude of greater than about 0.04 nm per layer number with an r-squared value 43 of greater than about 0.8, and a linear fit 44 (see, e.g., FIG. 7) to the at least N2 sequentially arranged polymeric layers in the middle region 32 has a negative linear slope 45 having a magnitude of greater than about 0.05 nm per layer number with an r-squared value 46 of greater than about 0.8. N1 is an integer greater than about 50 (e.g., at least 47, or at least 49, or at least 50, or at least 51). In some embodiments, N1 is greater than about 100, or greater than about 150, or greater than about 180. N2 is an integer greater than about 10. In some embodiments, N2 is greater than about 15 or greater than about 20.

In some embodiments, the optical film 100 further includes a second knee region 33 separating the middle region 32 from a right region 34 and including at least N3 sequentially arranged polymeric layers where the polymeric layers have higher layer numbers than the polymeric layers in the middle region, such that a linear fit 47 (see, e.g., FIG. 8) to the at least N3 sequentially arranged polymeric layers in the right region has a positive linear slope 48 having a magnitude of greater than about 1.2 nm per layer number with an r-squared value 49 of greater than about 0.6. N3 is an integer greater than about 3 (e.g., at least 3). In some embodiments, N3 is at least 3, 4, 5, or 6.

In some embodiments, an optical film 100 includes a plurality of polymeric layers 101, 102 including a polymeric end layer at each end thereof. The polymeric end layers and each layer therebetween can have an average thickness less than about 300 nm. A plot 20 of an average layer thickness t versus a layer number of the plurality of polymeric layers includes: a left region 36 including at least N4 sequentially arranged polymeric layers; a first middle region 31 including at least N1 sequentially arranged polymeric layers; a second middle region 32 including at least N2 sequentially arranged polymeric layers; and a right region 34 including at least N3 sequentially arranged polymeric layers, such that a linear fit 70 (see, e.g., FIG. 9) to the at least N4 sequentially arranged polymeric layers in the left region has a negative linear slope 71 having a magnitude of greater than about 0.04 nm per layer number with an r-squared value 72 of greater than about 0.8, a linear fit 41 (see, e.g., FIG. 6) to the at least N1 sequentially arranged polymeric layers in the first middle region 31 has a positive linear slope 42 having a magnitude of greater than about 0.04 nm per layer number with an r-squared value 43 of greater than about 0.8, a linear fit 44 (see, e.g., FIG. 5) to the at least N2 sequentially arranged polymeric layers in the second middle region 32 has a negative linear slope 45 having a magnitude of greater than about 0.05 nm per layer number with an r-squared value 46 of greater than about 0.8, and a linear fit 47 (see, e.g., FIG. 8) to the at least N3 sequentially arranged polymeric layers in the right region 34 has a positive linear slope 48 having a magnitude of greater than about 1.2 nm per layer number with an r-squared value 49 of greater than about 0.6. In some embodiments, N1 is an integer greater than about 50, N2 is an integer greater than about 10, N3 is an integer greater than about 3, and N4 is an integer greater than about 5 (e.g., at least 5). N1, N2, and N3 can be in any of the ranges described elsewhere. In some embodiments, N4 is at least 5, or at least 6, or at least 7. Note that a same region may be referred to as a first region or a second region, or a middle region or a left or right region, for example, depending on other elements or regions being discussed.

In some embodiments, the positive linear slope 42 of the linear fit 41 has a magnitude of greater than about 0.05 nm per layer number, or greater than about 0.06 nm per layer number, or greater than about 0.07 nm per layer number. In some such embodiments, or in other embodiments, the r-squared value 43 of the linear fit 41 is greater than about 0.8, or greater than about 0.85, or greater than about 0.9, or greater than about 0.93, or greater than about 0.95.

In some embodiments, the negative linear slope 45 of the linear fit 44 has a has a magnitude of greater than about 0.06 nm per layer number, or greater than about 0.07 nm per layer number, or greater than about 0.08 nm per layer number. In some such embodiments, or in other embodiments, the r-squared value 46 of the linear fit 44 is greater than about 0.8, or greater than about 0.85, or greater than about 0.9, or greater than about 0.93, or greater than about 0.95.

In some embodiments, the positive linear slope 48 of the linear fit 47 has a magnitude of greater than about 1.4 nm per layer number, or greater than about 1.5 nm per layer number, or greater than about 1.6 nm per layer number. In some such embodiments, or in other embodiments, the r-squared value 49 of the linear fit 47 is greater than about 0.6, or greater than about 0.7, or greater than about 0.8, or greater than about 0.85.

In some embodiments, the negative linear slope 71 to the linear fit 70 has a magnitude of greater than about 0.1 nm per layer number, or greater than about 0.5 nm per layer number, or greater than about 0.8 nm per layer number, or greater than about 1 nm per layer number, or greater than about 1.2 nm per layer number, or greater than about 1.4 nm per layer number. In some such embodiments, or in other embodiments, the r-squared value of the linear fit 70 is greater than about 0.8, or greater than about 0.85, or greater than about 0.9, or greater than about 0.93, or greater than about 0.95.

In some embodiments, a first knee region 35 separates the left region 36 from the first middle region 31, where the polymeric layers in the first middle region 31 have higher layer numbers than the polymeric layers in the left region 36. In some such embodiments or in other embodiments, a second knee region 30 separates the first middle region 31 from the second middle region 32, where the polymeric layers in the second middle region 32 have higher layer numbers than the polymeric layers in the first middle region 31. In some such embodiments or in other embodiments, a third knee region 33 separates the second middle region 32 from the right region 34, where the polymeric layers in the right region 34 have higher layer numbers than the polymeric layers in the second middle region 32.

Figure 10:
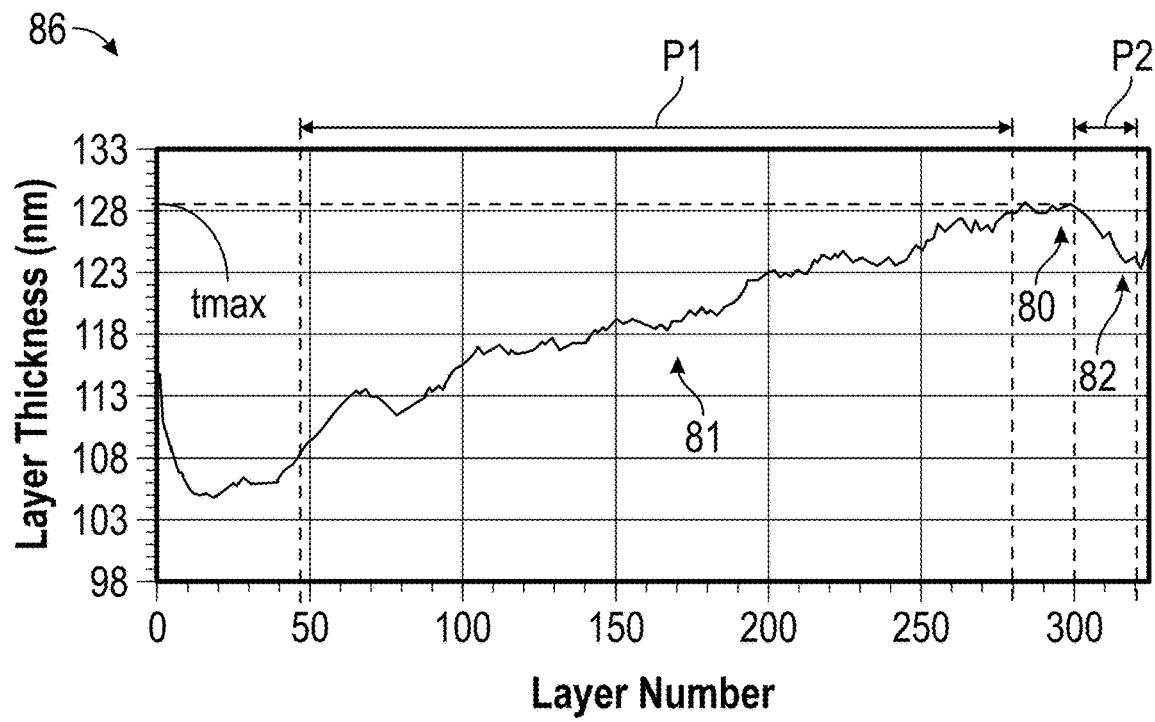
FIG. 10 is an illustrative plot of average layer thickness versus layer number for a plurality of polymeric layers where the plot has a knee region separating a left region from a right region.
Figure 11:
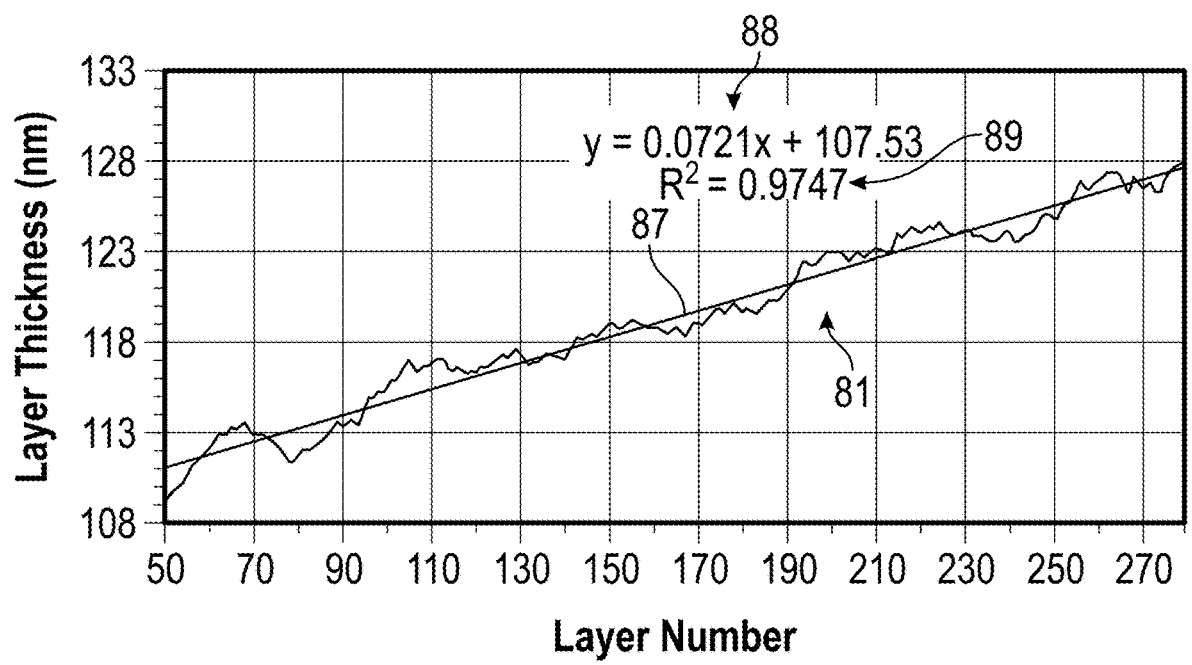
FIGS. 11-12 show portions of the plot of FIG. 10.
Figure 12:
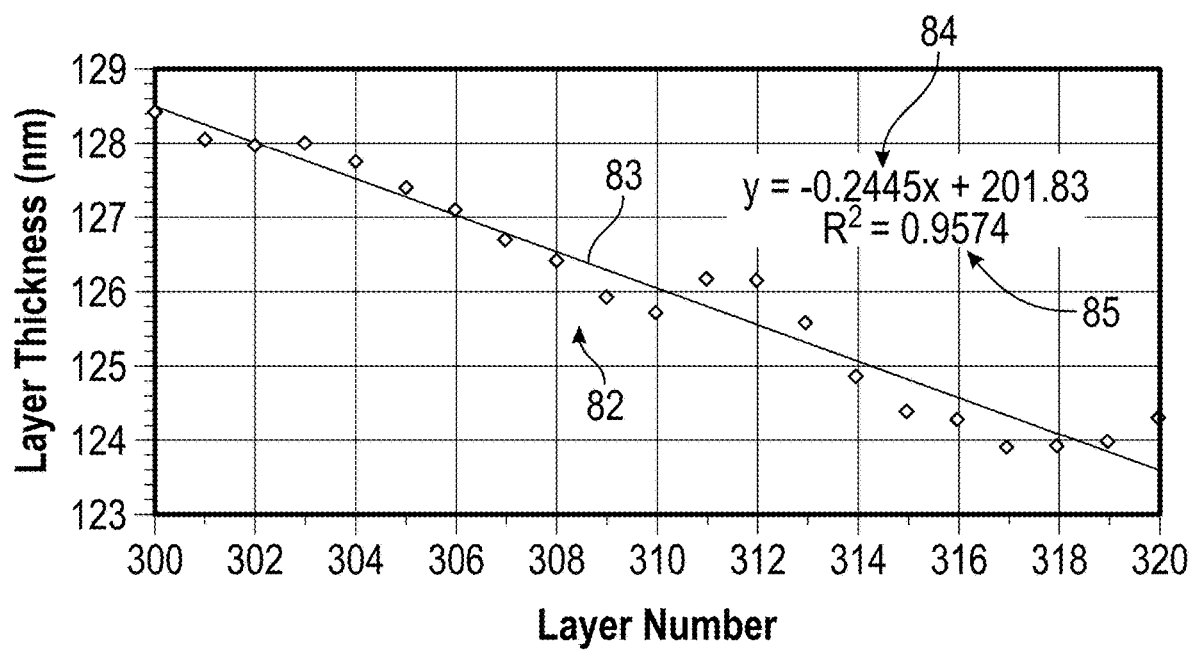

FIG. 10 is a plot 86 of average layer thickness versus layer number for a plurality of polymeric layers 101, 102, according to some embodiments. The thickness profile can be for a plurality of polymeric layers 101, 102 in an entire film or in a packet of a film. FIGS. 11-12 show portions of the plot of FIG. 10.

In some embodiments, an optical film 100 includes a plurality of polymeric layers 101, 102 arranged along at least a portion of a thickness (z-direction) of the optical film and sequentially numbered from 1 to P (e.g., corresponding to sequentially numbered layers 1 to N described elsewhere). P can be an integer greater than about 100, for example. The plurality of polymeric layers 101, 102 include a polymeric end layer (e.g., layers 22, 223) at each end thereof. The polymeric end layers and each layer therebetween can have an average thickness less than about 300 nm. A plot 86 of an average layer thickness t versus a layer number of the plurality of polymeric layers 101, 102 includes: a first knee region 80 separating a left region 81 including at least P1 sequentially arranged polymeric layers where the polymeric layers have lower layer numbers, from a right region 82 including at least P2 sequentially arranged polymeric layers where the polymeric layers have higher layer numbers, such that a linear fit 83 (see, e.g., FIG. 12) to the at least P2 sequentially arranged polymeric layers in the right region 82 has a negative linear slope 84 having a magnitude of greater than about 0.1 nm per layer number with an r-squared value 85 of greater than about 0.8. In some embodiments, P1 is an integer greater than about 50 and P2 is an integer greater than about 10. In some embodiments, P1 is at least 50, or at least 100, or at least 150, or at least 200. In some such embodiments or in other embodiments, P2 is at least 10, or at least 15, or at least 18.

In some embodiments, a linear fit 87 (see, e.g., FIG. 11) to the at least P1 sequentially arranged polymeric layers in the left region 81 has a positive linear slope 88 having a magnitude in a range of about 0.01 nm per layer number to about 0.25 nm per layer number with an r-squared value 89 of greater than about 0.8. In some embodiments, the linear fit 87 has a positive linear slope 88 in a range of about 0.02 nm per layer number, or about 0.03 nm per layer number, or about 0.04 nm per layer number to about 0.2 nm per layer number or to 0.15 nm per layer number. In some such embodiments or in other embodiments, the linear fit 87 has an r-squared value 89 of greater than about 0.8, or greater than about 0.85, or greater than about 0.9, or greater than about 0.93, or greater than about 0.95.

In some embodiments, the negative linear slope 84 of the linear fit 83 has a magnitude greater than about 0.15 nm per layer number, or greater than about 0.2 nm per layer number, or greater than about 0.22 nm per layer number. In some such embodiments or in other embodiments, r-squared value 85 of the linear fit 83 of greater than about 0.8, or greater than about 0.85, or greater than about 0.9, or greater than about 0.93, or greater than about 0.95.

In some embodiments, an optical film 100 includes a plurality of polymeric layers 101, 102 arranged along at least a portion of a thickness of the optical film and sequentially numbered from 1 to N, where N is an integer greater than about 100 or greater than about 200. The plurality of polymeric layers includes a polymeric end layer (e.g., layers 22, 223) at each end thereof, where the polymeric end layers and each layer therebetween has an average thickness less than about 300 nm. The optical film can have a layer thickness profile as shown in FIGS. 13-16, for example.

Figure 13:
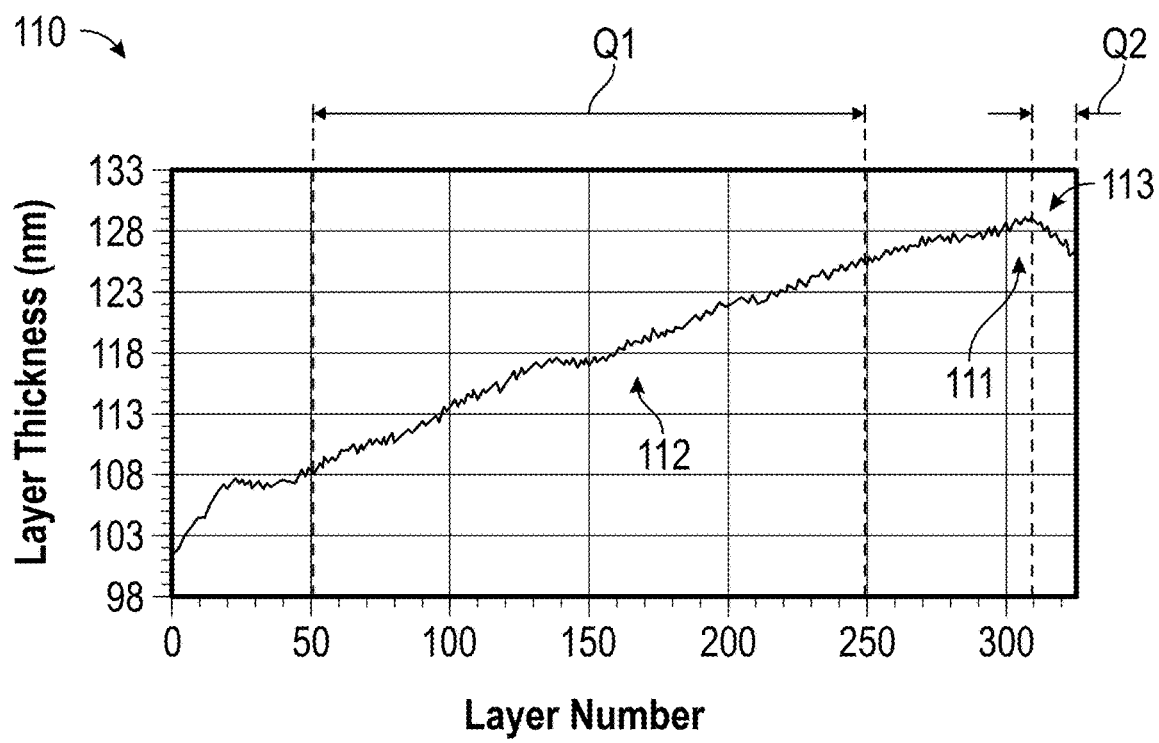
FIG. 13 is an illustrative plot of average layer thickness versus layer number for a plurality of polymeric layers according to some embodiments.
Figure 14:
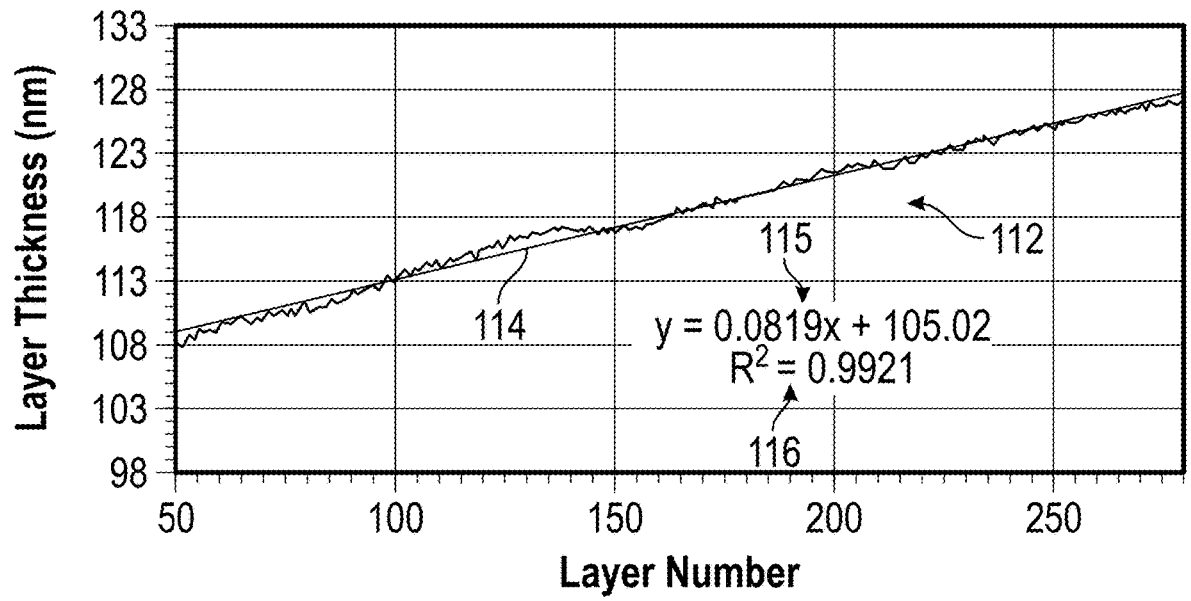
FIGS. 14-16 show portions of the plot of FIG. 13.
Figure 15:
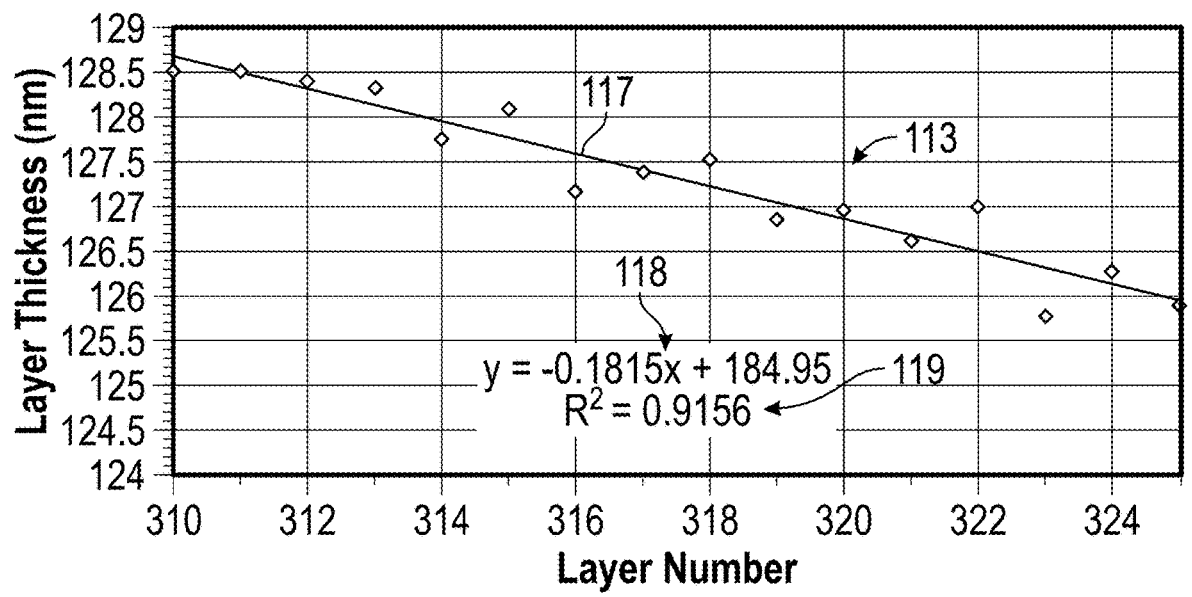
Figure 16:
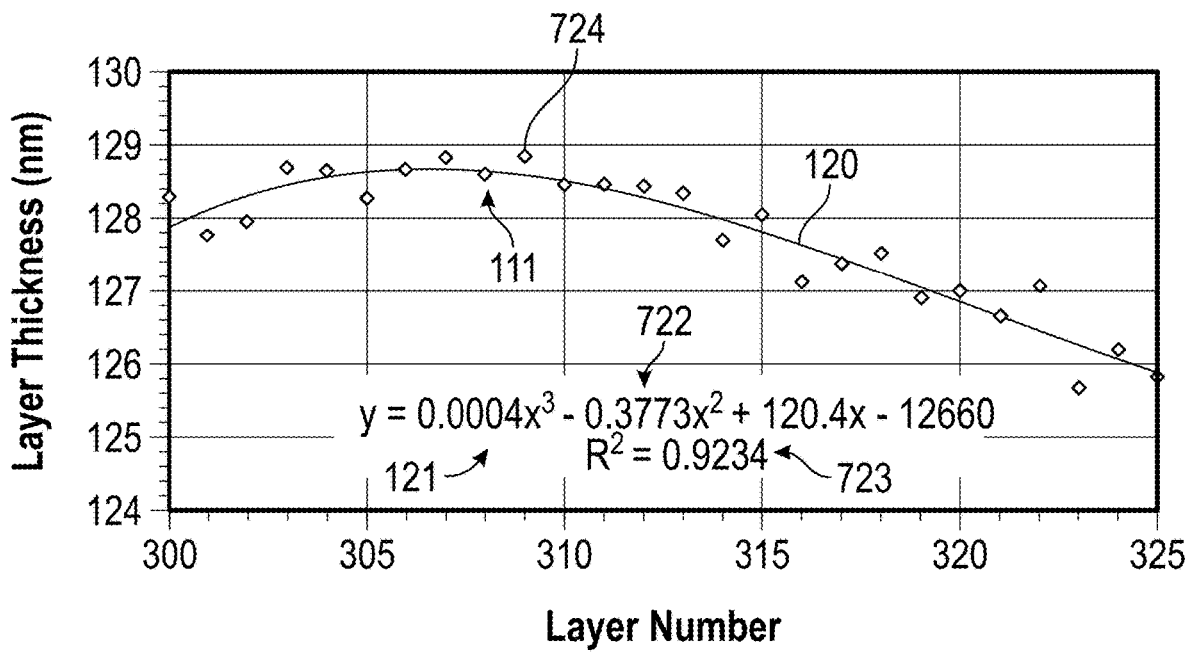

FIG. 13 is a plot 110 of average layer thickness versus layer number for a plurality of polymeric layers 101, 102, according to some embodiments. The thickness profile can be for a plurality of polymeric layers 101, 102 in an entire film or in a packet of a film. FIGS. 14-16 show portions of the plot of FIG. 13.

In some embodiments, the optical film is configured such that for a substantially normally incident light 50 and for the at least one polarization state, an optical transmittance 130 (see, e.g., FIG. 20) of the optical film versus wavelength has a band edge 131. In some embodiments, the band edge 131 is between about 800 nm and about 1100 nm. In some embodiments, a plot 110 of an average layer thickness t versus a layer number of the plurality of polymeric layers 101, 102 includes a knee region 111 separating a left region 112 including at least Q1 sequentially arranged polymeric layers where the polymeric layers have lower layer numbers, from a right region 113 including at least Q2 sequentially arranged polymeric layers where the polymeric layers have higher layer numbers, such that a linear fit 114 (see, e.g., FIG. 14) to the at least Q1 sequentially arranged polymeric layers in the left region 112 has a positive linear slope 115 having a magnitude of greater than about 0.04 nm per layer number with an r-squared value 116 of greater than about 0.8, and a linear fit 117 (see, e.g., FIG. 15) to the at least Q2 sequentially arranged polymeric layers in the right region 113 has a negative linear slope 118 having a sufficiently large magnitude so that the best linear fit 132 (see, e.g., FIG. 21) has a slope 133 of greater than about 3%/nm, or greater than about 4%/nm, or in any of the ranges described elsewhere herein for a band edge slope. In some embodiments, the best linear fit 132 has an r-squared value 138 of greater than about 0.8, or greater than about 0.85, or greater than about 0.9, or greater than about 0.93, or greater than about 0.95. Q1 is an integer greater than about 100. In some embodiments, Q1 is at least 100, or at least 150, or at least 180. Q2 is an integer greater than about 10. In some embodiments, Q2 is at least 10, or at least 12, or at least 14.

In some embodiments, the linear fit 117 to the at least Q2 sequentially arranged polymeric layers in the right region 113 has a negative linear slope 118 having a magnitude of greater than about 0.1 nm per layer number with an r-squared value 119 of greater than about 0.8. In some embodiments, the negative linear slope 118 of the linear fit 117 has a magnitude of greater than about 0.12 nm per layer number, or greater than about 0.14 nm per layer number, or greater than about 0.16 nm per layer number. In some such embodiments or in other embodiments, the r-squared value 119 of the linear fit 117 is greater than about 0.8, or greater than about 0.85, or greater than about 0.9.

In some embodiments, the positive linear slope 115 of the linear fit 114 has a magnitude of greater than about 0.05 nm per layer number, or greater than about 0.06 per layer number, or greater than about 0.07 per layer number. In some such embodiments or in other embodiments, the r-squared value 116 of the linear fit 114 is greater than about 0.8, or greater than about 0.85, or greater than about 0.9, or greater than about 0.95.

In some embodiments, a plot 110 of an average layer thickness t versus a layer number of the plurality of polymeric layers includes a knee region 111 separating a left region 112 including at least 100 sequentially arranged polymeric layers where the polymeric layers have lower layer numbers, from a right region 113 including at least 10 sequentially arranged polymeric layers where the polymeric layers have higher layer numbers, such that a third order polynomial fit 120 (see, e.g., FIG. 14) to at least 15 sequentially arranged polymeric layers including the knee region 111 has a positive third order coefficient 121 and a negative second order coefficient 722 with an r-squared value 723 of greater than about 0.8. In some embodiments, the r-squared value 723 is greater than about 0.85, or greater than about 0.9. In some embodiments, the left region 112 includes at least 150 or at least 180 sequentially arranged polymeric layers. In some embodiments, the right region 113 includes at least 12 or at least 14 sequentially arranged polymeric layers.

In some embodiments, an optical film 100 includes a plurality of polymeric layers 101, 102 sequentially numbered from 1 to N, where N is an integer greater than about 100 or at least 150 and each of the polymeric layers 101, 102 has an average thickness less than about 300 nm. The optical film 100 may include other layers (e.g., 105, 105', 104) in addition to the polymeric layers 101, 102 that are thicker than about 500 nm, for example. In some embodiments, a plot 110 of an average layer thickness t versus a layer number of the plurality of polymeric layers 101,102 includes a knee region 111 including a thickest polymeric layer 724 in the plurality of polymeric layers 101, 102, such that the optical film 100 or the plurality of polymeric layers 101, 102 has reflectance and transmittance properties described elsewhere herein.

In some embodiments, the layer thickness profile in region 32, 82, or 113 is decreasing with increasing layer number as described by an exponential function as described further elsewhere herein.

Figure 17:
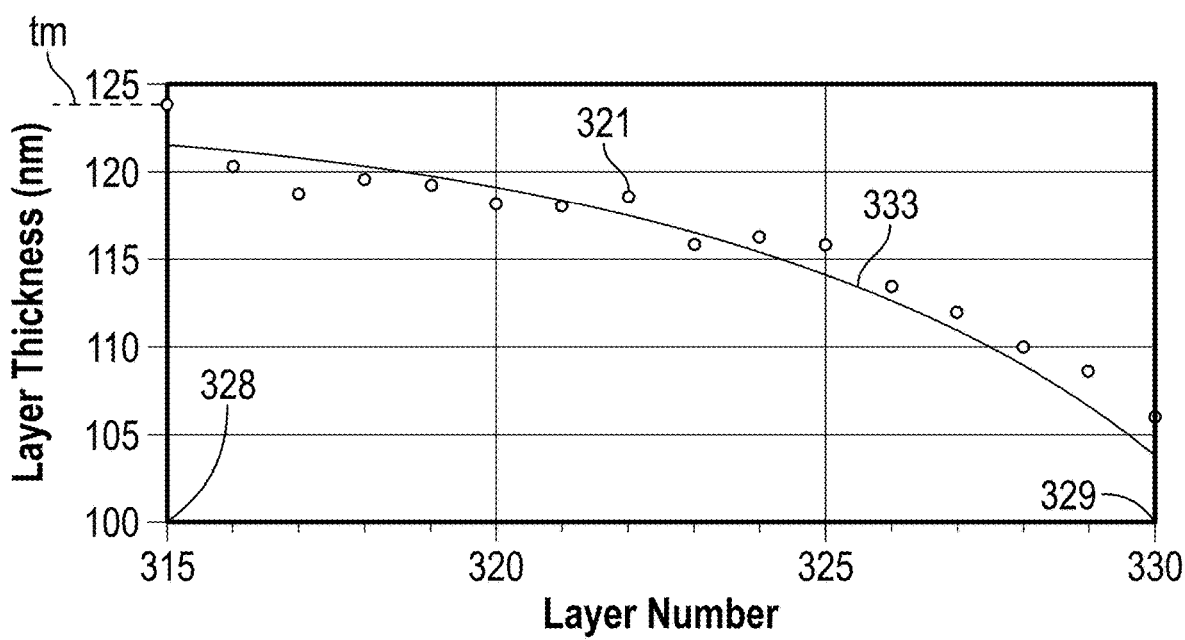
FIG. 17 is a schematic illustrative plot of average layer thickness versus layer number for a portion of a plurality of polymeric layers.

FIG. 17 is a schematic plot of average layer thickness 321 versus layer number for an mth layer 328 to an Nth layer 329, according to some embodiments. In some embodiments, an mth layer 328 in the plurality of the polymeric layers 101, 102 has an average thickness tm, m<N, such that an average thickness of each polymeric layer in the plurality of polymeric layers 101, 102 having a layer number n, m≤n≤N, is within about 10% of $$tm - Ae^{\frac{-(N-n)}{d}} \text{ (curve 333)},$$

where

A is a real number and d is an integer. In some embodiments, 0.01tm≤A≤0.25tm or 0.01tm≤A≤0.2tm. In some embodiments, 0.005N≤d≤0.1N or 0.01N≤d≤0.1N. In some embodiments, N-m≥5, or N-m≥8, or N-m≥10. In some embodiments, the average thickness of the polymeric layer 329 having the layer number N is at least about 10%, or at least about 12%, or at least about 14% less than tm. In some embodiments, the average thickness of each polymeric layer in the plurality of polymeric layers 101, 102 having a layer number n, m≤n≤N, is within about 5%, or In some embodiments, the average within about 4%, or within about 3% of $$tm - Ae^{\frac{-(N-n)}{d}}.$$

thickness of each polymeric layer in the plurality of polymeric layers 101, 102 having a layer number n, m<n≤N, is within about 5%, or within about 4%, or within about 3%, or within about 2% of $$tm - Ae^{\frac{-(N-n)}{d}}.$$

For the illustrated curve 333, d=7, A=20 nm, N=330, m=315, and tm=124 nm. The parameter A specifies the amplitude of the apodization (shift in layer thickness profile near a side of a packet or film) and the parameter d determines the number of layers having a significant shift in thickness.

Figure 18:
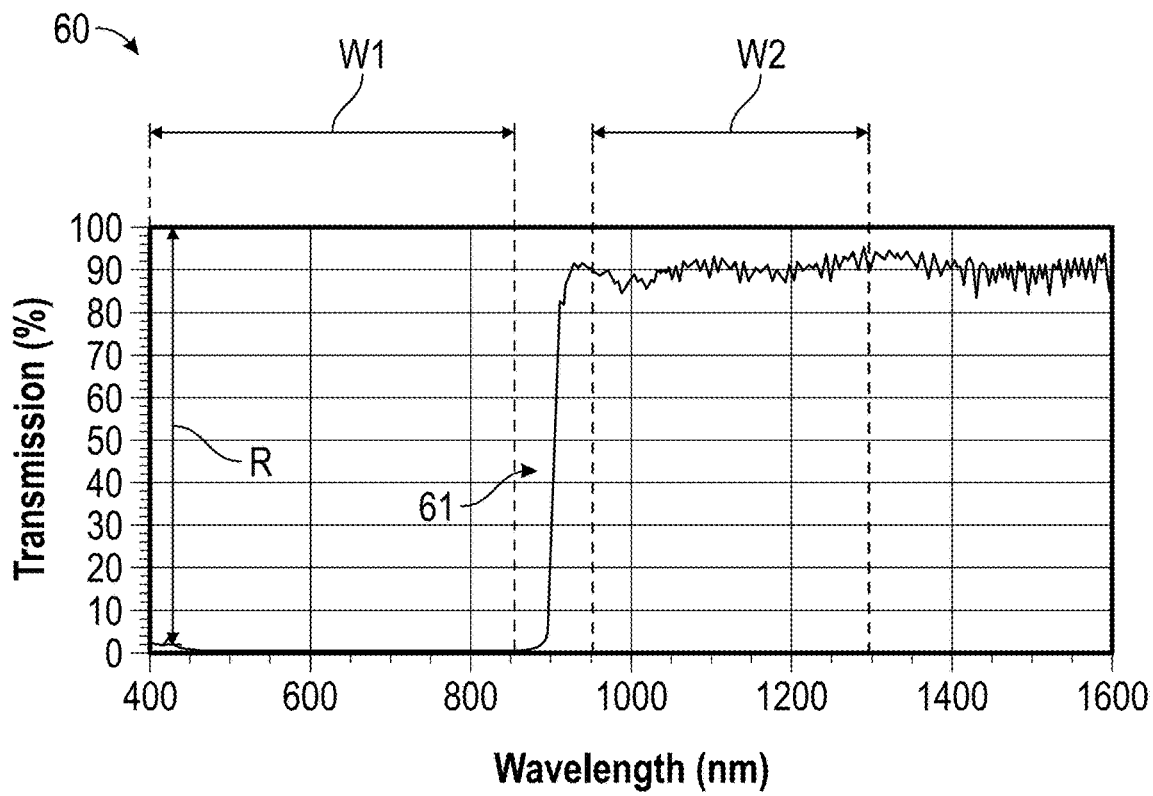
FIG. 18 is an illustrative plot of the optical transmittance of an optical film versus wavelength.
Figure 19:
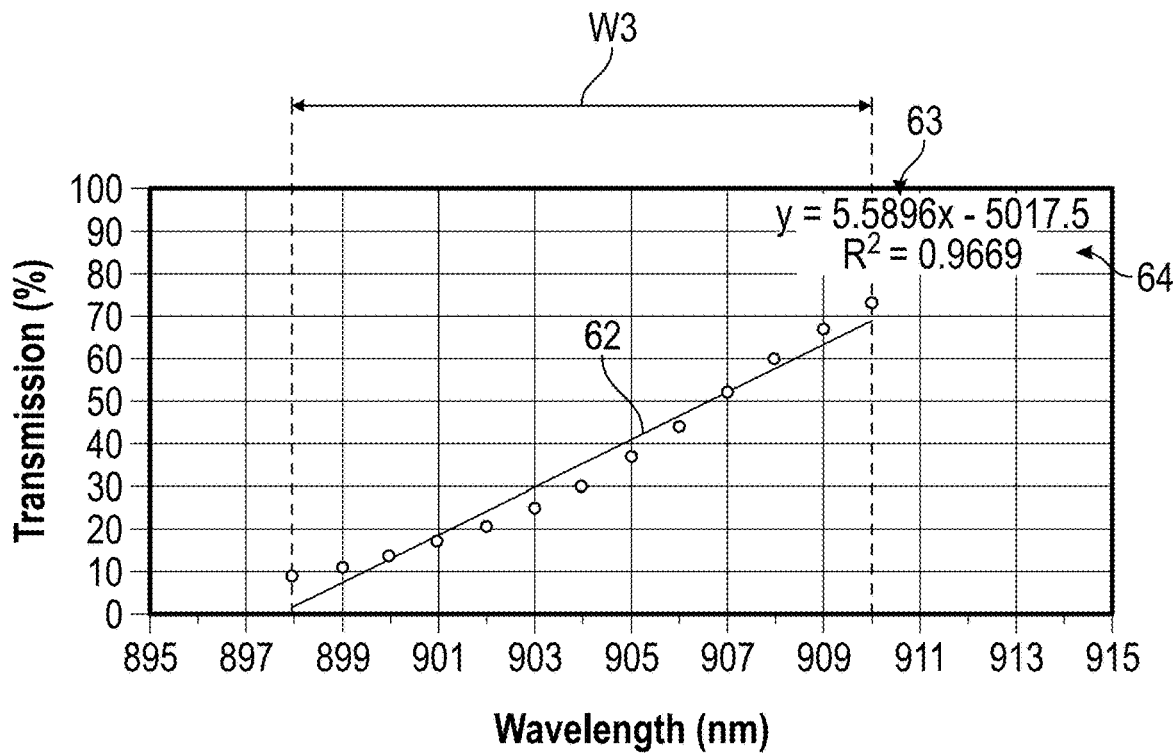
FIG. 19 is a portion of the plot of FIG. 18.

FIG. 18 is a plot of the optical transmittance 60 of an optical film 100 versus wavelength, according to some embodiments. FIG. 19 is a portion of the plot of FIG. 18 near a band edge 61. The optical transmittance 60 can be for substantially normally incident light 50 having a first polarization state 171. In some embodiments, the optical film is a reflective polarizer substantially transmitting light having a second polarization state 172 orthogonal to the first polarization state 171. In other embodiments, the optical film is a mirror film having an optical transmittance similar to optical transmittance 60 for substantially normally incident light 50 having the second polarization state 172. The layer thickness profile of FIG. 5 for a packet reflecting longer wavelengths in an optical film also including a packet reflecting shorter wavelengths can produce the optical transmittance 60. The layer thickness profile of FIG. 10 can produce a similar optical transmittance. In some embodiments, the optical film 100 or of the plurality of polymeric layers 101, 102 is substantially non-absorbing so that an optical reflectance R of the optical film is substantially equal to 100% minus the optical transmittance of the optical film.

In some embodiments, for substantially normally incident light 50 and a first wavelength range W1 extending from about 400 nm to about 800 nm and a second wavelength range W2 extending from about 950 nm to about 1300 nm, the plurality of polymeric layers 101, 102 or the optical film 100: reflects greater than about 80% of the incident light having a first polarization state 171 in the first wavelength range W1; and, in some embodiments, transmits greater than about 60% of the incident light in the second wavelength range W2 for each of the first and second polarization states 171 and 172. In some embodiments, the plurality of polymeric layers 101, 102 or the optical film 100 transmits greater than about 40% or greater than about 50% of the incident light having the second polarization state 172 in the first wavelength range W1. In other embodiments, the plurality of polymeric layers 101, 102 or the optical film 100 reflects greater than about 80% of the incident light having the second polarization state 172 in the first wavelength range W1. In some embodiments, the plurality of polymeric layers 101, 102 or the optical film 100 transmits greater than about 70%, or greater than about 80% of the incident light in the second wavelength range W2 for each of the first and second polarization states 171 and 172. In some embodiments, for substantially normally incident light 50, the optical film 100 or the plurality of polymeric layers 101, 102 reflects greater than about 80% of the incident light 50 in the first wavelength range W1 for the first polarization state 171 and for an orthogonal second polarization state 172. In some such embodiments or in other embodiments, the plurality of polymeric layers 101, 102 or the optical film 100: transmits greater than about 60%, or greater than 70%, or greater than about 80% of the incident light in the second wavelength range W2 for each of the first and second polarization states 171 and 172.

In some embodiments, for a substantially normally incident light 50 having a first polarization state 171, an optical transmittance 60 of the optical film versus wavelength includes a band edge 61 between about 850 nm and about 950 nm, such that a best linear fit 62 (see, e.g., FIG. 19) to the band edge correlating the optical transmittance to the wavelength at least across a wavelength range W3 where the optical transmittance increases from about 10% to at least about 70% (e.g., from about 10% to about 70%, or from about 10% to about 80%, or from about 10% to at least about 80%) has a slope 63 of greater than about 3%/nm. In some embodiments, the slope 63 is greater than about 3.5%/nm, or greater than about 4%/nm, or greater than about 4.5%/nm, or greater than about 5%/nm. In some embodiments, the best linear fit 62 has an r-squared value 64 of greater than about 0.8, or greater than about 0.85, or greater than about 0.9, or greater than about 0.93, or greater than about 0.95.

Figure 20:
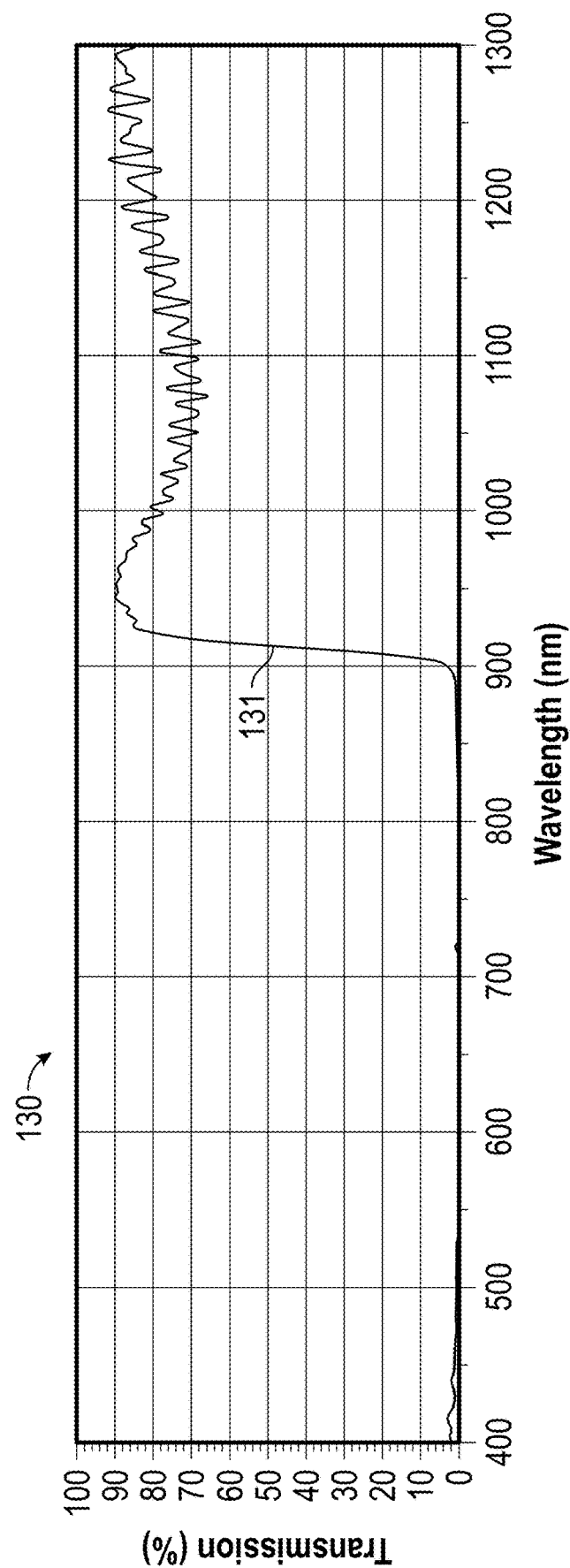
FIG. 20 is a plot of the optical transmittance of an optical film versus wavelength according to some embodiments.
Figure 21:
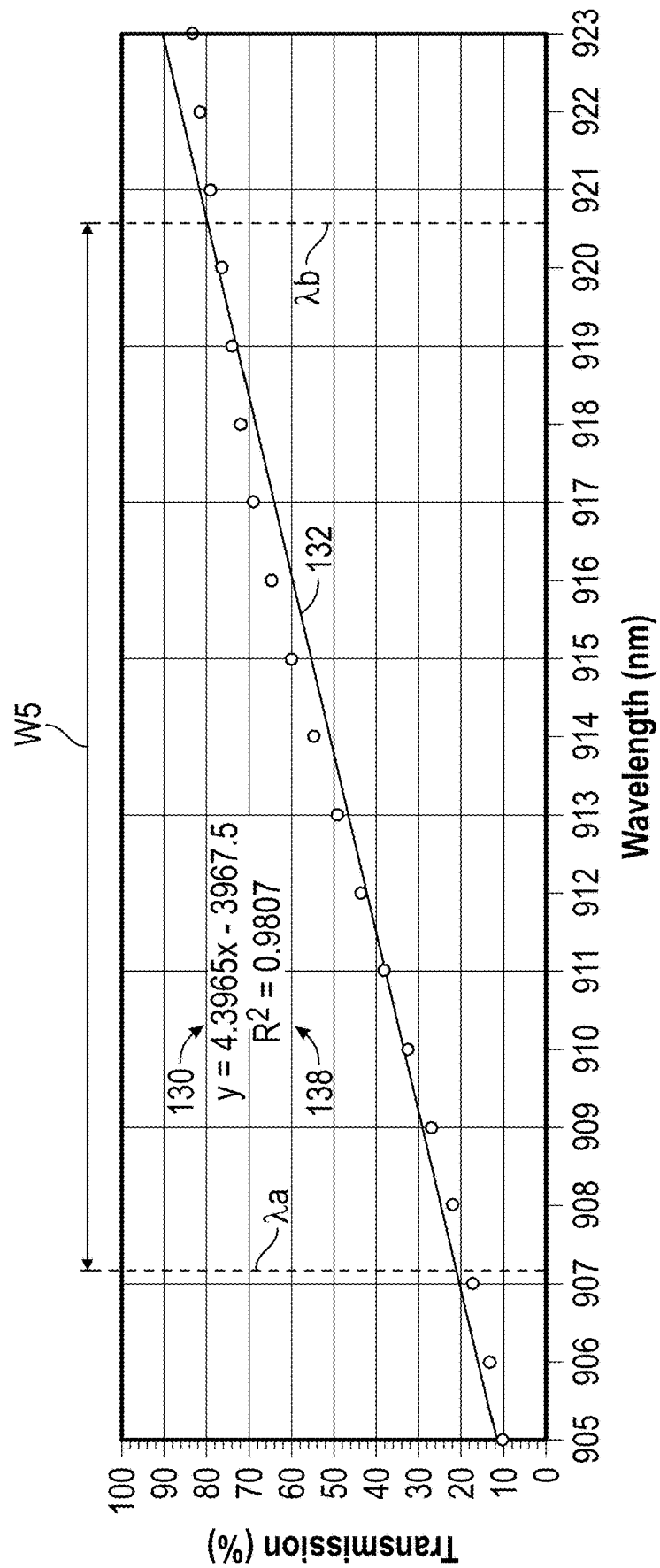
FIGS. 21-22 are portions of the plot of FIG. 20.
Figure 22:
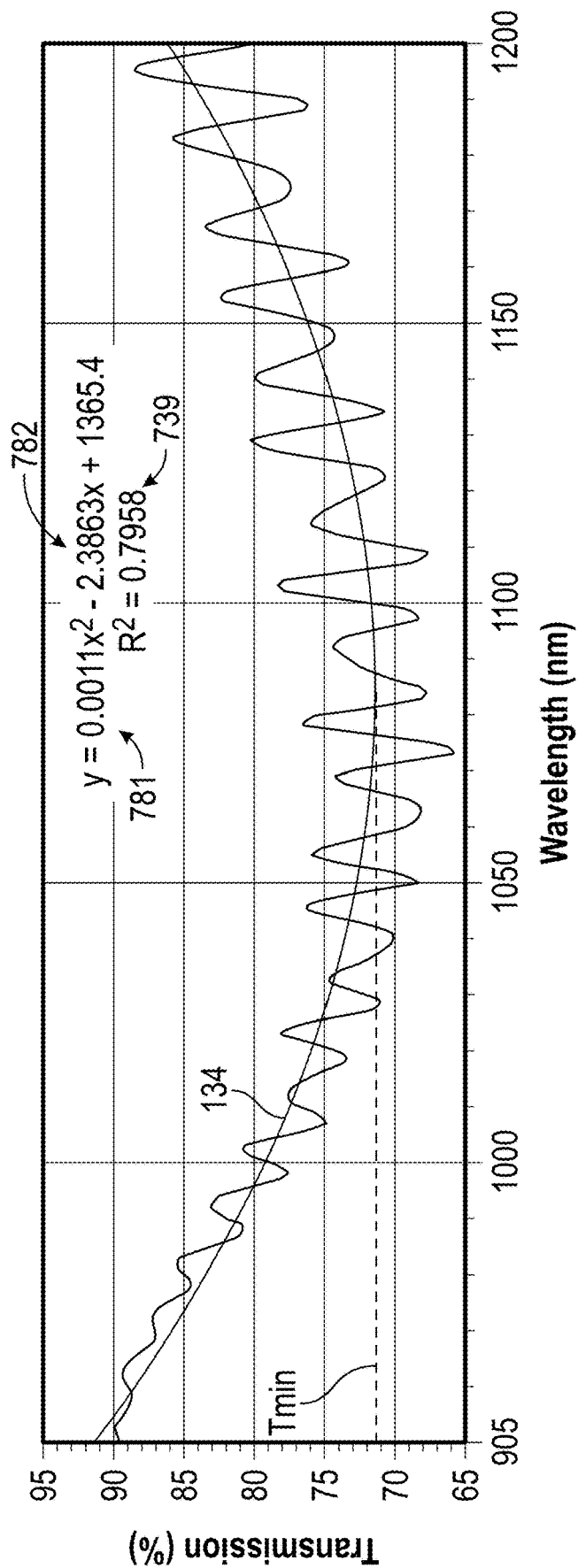

FIG. 20 is a plot of the optical transmittance 130 of an optical film 100 versus wavelength. FIGS. 21-22 are portions of the plot of FIG. 20. The optical transmittance 130 can be for substantially normally incident light 50 having a first polarization state 171. In some embodiments, the optical film is a reflective polarizer substantially transmitting light having a second polarization state 172 orthogonal to the first polarization state 171. In other embodiments, the optical film is a mirror film having an optical transmittance similar to optical transmittance 130 for substantially normally incident light 50 having the second polarization state 172. The layer thickness profile of FIG. 13 for a packet reflecting longer wavelengths in an optical film also including a packet reflecting shorter wavelengths can produce the optical transmittance 130.

In some embodiments, the plurality of polymeric layers 101, 102 or the optical film 100: reflects greater than about 80% of the incident light 50 having a first polarization state 171 in the first wavelength range W1; transmits greater than about 40%, or greater than about 50%, of the incident light having a second polarization state 172, orthogonal to the first polarization state, in the first wavelength range W1; transmits greater than about 60% of the incident light in the second wavelength range W2 for each of the first and second polarization states 171 and 172; and an optical transmittance 130 of the optical film versus wavelength for the first polarization state 171 includes a band edge 131 between about 800 nm and about 1100 nm. In some embodiments, the band edge 131 is between about 850 nm and about 950 nm. In some embodiments, a best linear fit 132 (see, e.g., FIG. 19) to the band edge 131 correlating the optical transmittance to the wavelength at least across a wavelength range where the optical transmittance along the band edge increases from about 10% to at least about 70% has a slope 133 of greater than about 3%/nm or in any of the ranges described elsewhere for a band edge slope (e.g., greater than about 4%/nm).

In some embodiments, a wavelength range W5 (see, e.g., FIG. 21) from a first wavelength Aa where the best linear fit 132 is 20% to a second wavelength Ab where the best linear fit 132 is 80% is less than about 30 nm wide, or less than about 20 nm wide, or less than about 15 nm wide. In some embodiments, a wavelength range from a smallest wavelength greater than about 600 nm where the transmittance is at least about 20% to a smallest wavelength greater than about 600 nm where the transmittance is at least about 80% is less than about 30 nm wide, or less than about 20 nm wide, or less than about 15 nm wide.

In some embodiments, a second order polynomial fit 134 (see, e.g., FIG. 22) to the optical transmittance 130 across a wavelength range at least 200 nm wide between the band edge and about 2000 nm or about 1600 nm or about 1300 nm has an r-squared value 739 of greater than about 0.6 and a minimum optical transmittance Tmin of less than about 80%. The wavelength range between the band edge and about 2000 nm or about 1600 nm or about 1300 nm can be the range from about 950 nm to about 1200 nm, for example. In some embodiments, the r-squared value 739 is greater than about 0.7 or greater than about 0.75. In some embodiments, the second order polynomial fit 134 has a positive second order coefficient 781 and a negative first order coefficient 782. In some embodiments, the second order polynomial fit 134 has a minimum optical transmittance Tmin of less than about 75%. In some embodiments, the minimum optical transmittance Tmin is greater than about 60% or greater than about 65%.

Figure 23:
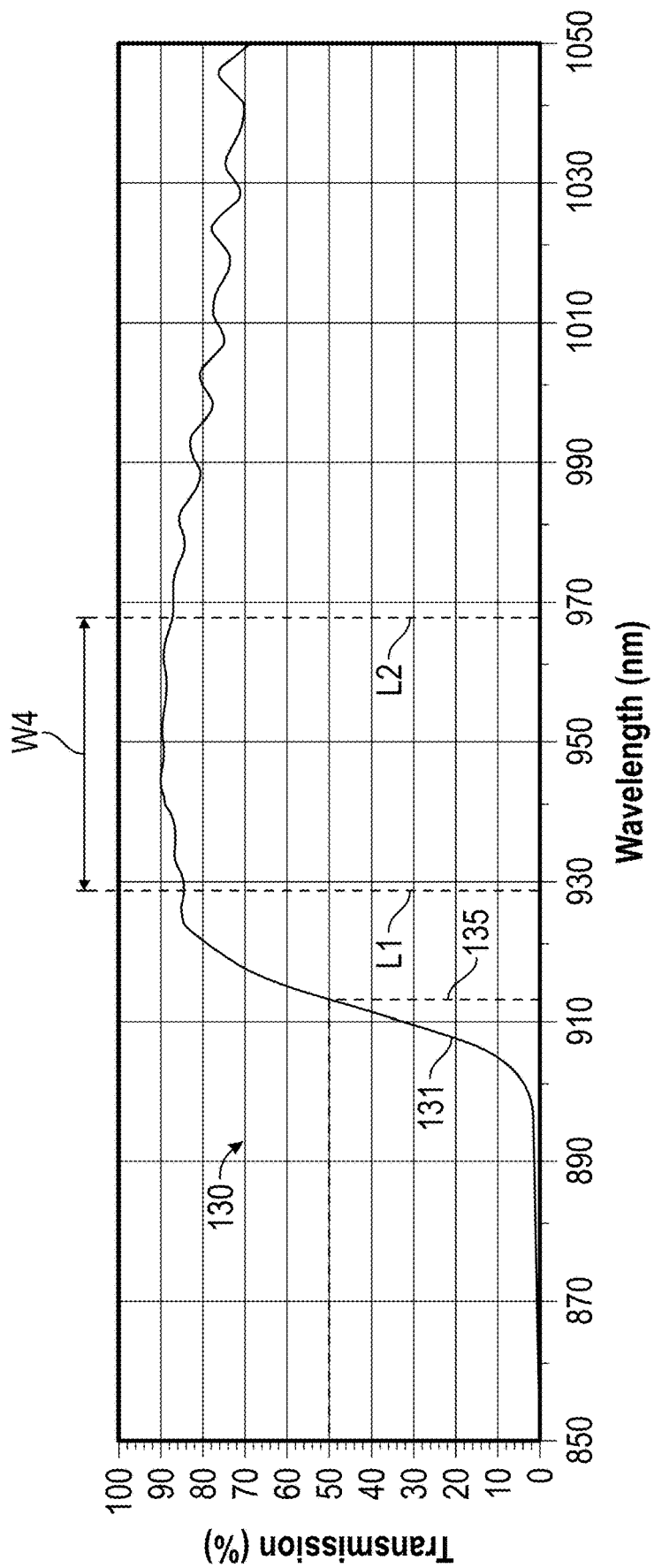

In some embodiments, for the substantially normally incident light 50 and for the at least one polarization state and for a third wavelength range W4 extending from a smaller wavelength L1 to a greater wavelength L2 (see, e.g., FIG. 23), where 30 nm≤L2-L1≤50 nm and L1 is greater than and within about 20 nm of a wavelength 135 corresponding to an optical transmittance of about 50% along the band edge, the optical transmittance 130 has an average of greater than about 75%, or greater than about 80%, or greater than about 85%. In some embodiments, 35 nm≤ L2-L1≤45 nm. In some embodiments, L1 is within about 18 nm or within about 16 nm of the wavelength 135. In some embodiments, an electronic device 170 includes an infrared (IR) light element 169 adapted to receive or transmit infrared light primarily at a wavelength (e.g., about 940 nm) in the wavelength range W4.

The linear fits described herein can be linear least squares fits as is known in the art. Polynomial fits can similarly be least squares fits. Such fits minimize the sum of squares of residuals where a residual is the difference between data and the fitted curve (line or polynomial). The least squares analysis allows the r-squared value, sometimes referred to as the coefficient of determination, to be determined.

It is typically desired that the optical film (and/or the housing including the optical film) has a high transmission for at least one frequency in a range of about 0.1 GHz to about 90 GHz. For example, the optical film may be used in a 5G cell phone housing and it may be desired for the optical film to be transmissive for the 5G frequencies used by the cell phone. In addition to, or as an alternative to, the transmission of the optical film, the reflection from the film and/or the loss tangent of the film may be specified.

The transmission and reflection can be determined from scattering parameters determined using a two-port free space measurement. For example, the scattering parameter S21, which may be referred to as the insertion loss, can be determined from a two-port free space measurement and can be defined as 10 times the base 10 logarithm of the ratio of transmitted power to incident power. An insertion loss (S21) of −0.1 dB, for example, means that approximately 97.7% of the incident power is transmitted through the film. As another example, the scattering parameter S11, which may be referred to as the return loss, can be determined from a two-port free space measurement and can be defined as 10 times the base 10 logarithm of the ratio of reflected power to incident power. A return loss (S11) of −20 dB, for example, means that 1% of the incident power is reflected from the film.

Figure 24:
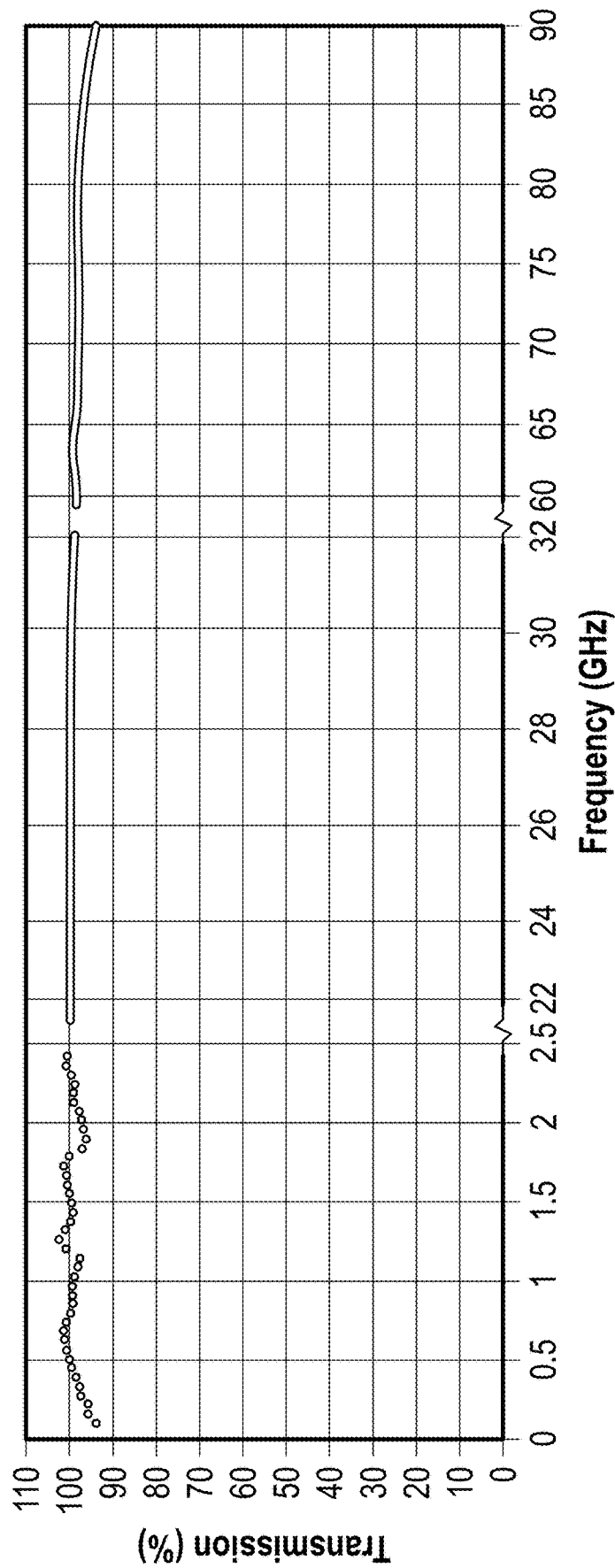
FIG. 24 is a plot of transmission through an illustrative optical film.

FIG. 24 is a plot of transmission through an exemplary optical film as a function of frequency. The data at low frequencies (below about 2.5 GHZ) was determined according to the ASTM D4935-18 test standard. Error in the measurement resulted in some numbers going a little above 100%. The remaining data in the plot was determined using two-port free space measurements.

Figure 25A:
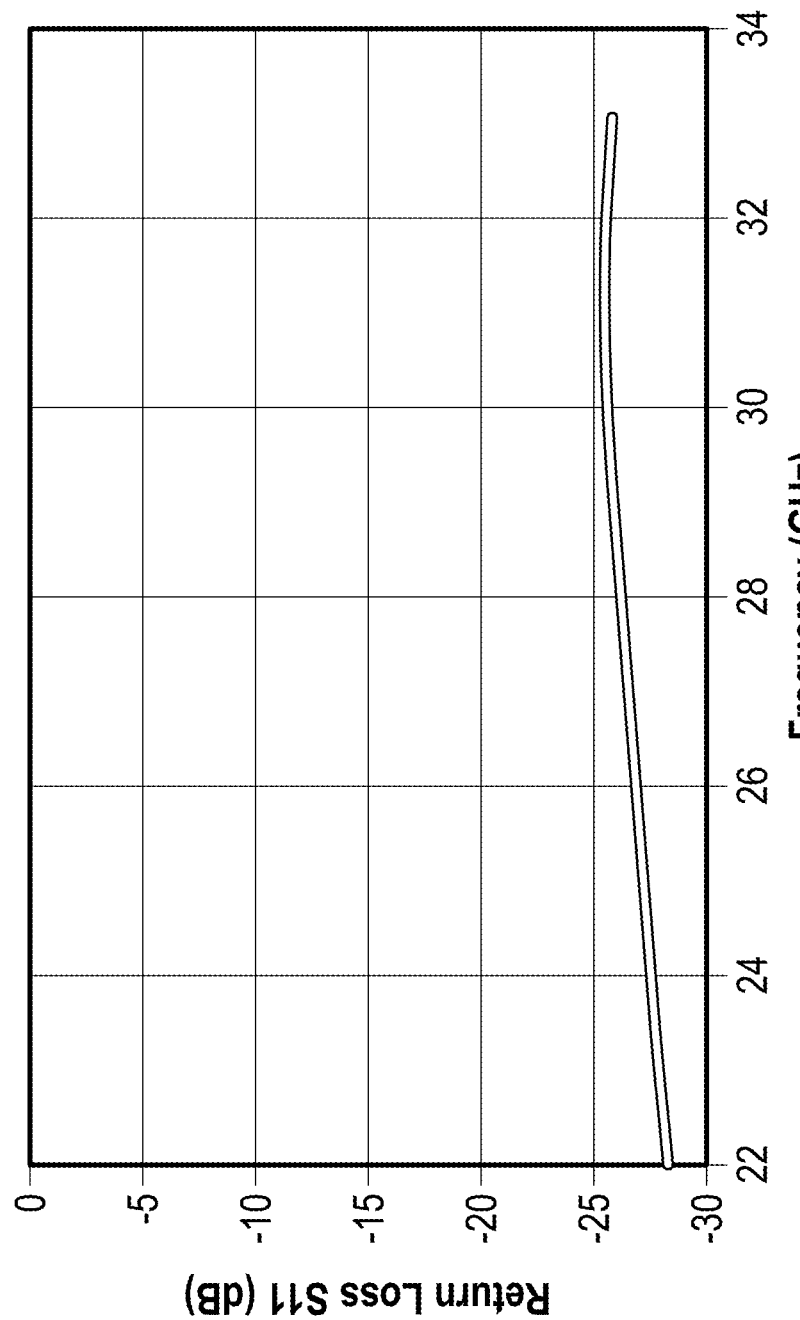
FIGS. 25A-25B are plots of the return loss S11 for an illustrative optical film.
Figure 25B:
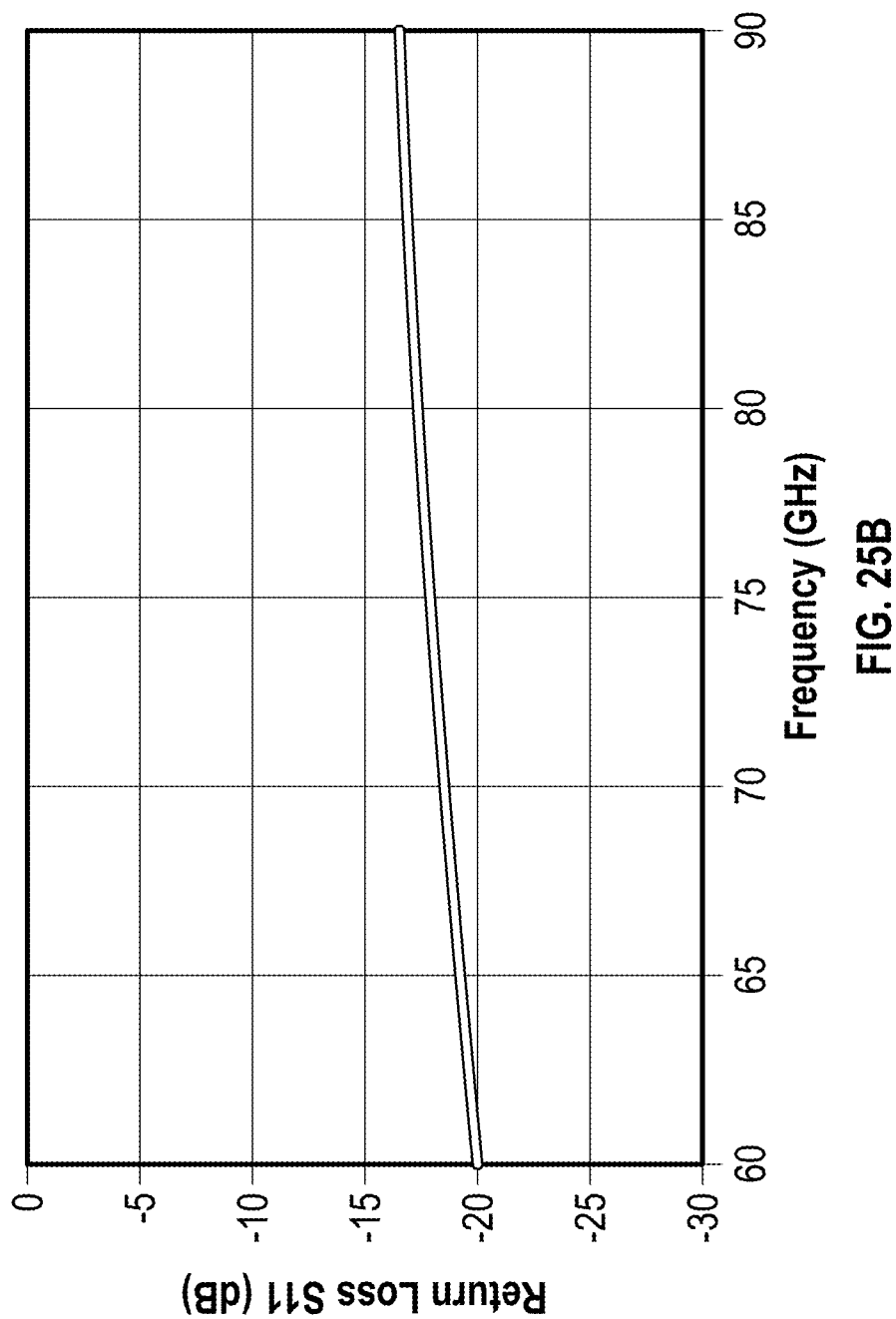

FIGS. 25A-25B are plots of the return loss S11 for an optical film, according to some embodiments, in two different frequency ranges as determined using two-port free space measurements.

Figure 26:
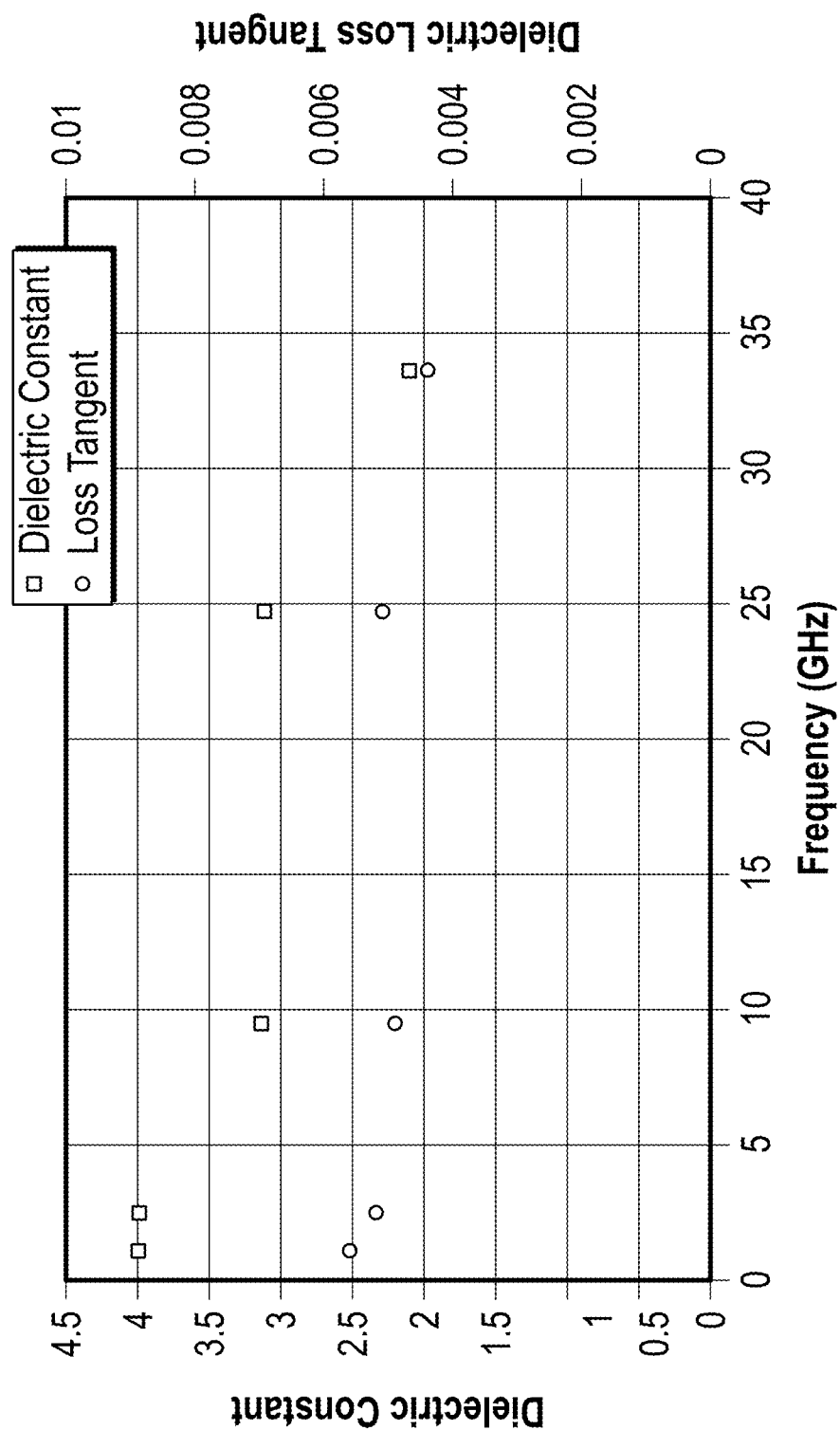
FIG. 26 is a plot of the real part of the dielectric constant and the loss tangent as a function of frequency for an illustrative optical film.

Dielectric properties of the optical film were determined using the split post dielectric resonance cavity method. FIG. 26 is a plot of the real part of the dielectric constant and the loss tangent (tan delta) as a function of frequency. The IEC 61189-2-721 test standard, for example, can be used to determine dielectric properties in the frequency range of 1 GHz to 33 GHz.

The data shown in FIGS. 24 to 26 are for a film made generally as described for Example 2 of International Appl. Pub. No. WO 2020/053832 (Fabick et al.).

In some embodiments, for at least one frequency in a range of about 0.1 GHz to about 90 GHz and for substantially normally incident radiation, the optical film transmits at least about 95%, or at least about 97%, or at least about 98%, or at least about 99% of the incident radiation. In some embodiments, for at least one frequency in a range of about 0.1 GHz to about 90 GHz and for substantially normally incident radiation, a dielectric loss tangent of the optical film is less than about 0.02, or less than about 0.01, or less than about 0.008, or less than about 0.006. In some embodiments, for at least one frequency in a range of about 0.1 GHz to about 90 GHz and for substantially normally incident radiation, the optical film reflects less than about 5%, or less than about 2%, or less than about 1% of the incident radiation. In some embodiments, for at least one frequency in a range of about 0.1 GHz to about 90 GHz, a real part of a dielectric constant of the optical film is no more than about 4, or no more than about 3.5, or no more than about 3.2. The at least one frequency referred to for any of these properties may include the same frequency or frequencies as the at least one frequency referred to for any other of these the properties.

In some embodiments, a combination of two or more of these properties are in at least one of these ranges. For example, in some embodiments, for at least one frequency in a range of about 0.1 GHz to about 90 GHz: a dielectric loss tangent of the optical film is less than about 0.02; and for substantially normally incident radiation, the optical film reflects less than about 5% of the incident radiation; or a dielectric loss tangent of the optical film is less than about 0.01; and for substantially normally incident radiation, the optical film reflects less than about 2% of the incident radiation; or a loss tangent of the optical film is less than about 0.006; and for substantially normally incident radiation, the optical film reflects less than about 1% of the incident radiation.

In some embodiments, the at least one frequency in a range of about 0.1 GHz to about 90 GHz includes at least one frequency in a 5G band as defined by the 3GPP Release 15 or at least one frequency in a range of about 64 GHz to about 71 GHz. 3GPP refers to the 3rd Generation Partnership Project which is a standards organization that released Release 15, which relates to 5G New Radio (NR), in 2018. In some embodiments, the at least one frequency in a range of about 0.1 GHz to about 90 GHz includes at least one frequency in a range of 0.6 to 0.7 GHZ, or 2.45 to 2.55 GHz, or 3.3 to 4.2 GHz, or 4.4 to 5 GHz, or 5.9 to 7.1 GHZ, or 24 to 29 GHz, or 37 to 50 GHz, or 64 to 71 GHz. In some embodiments, the at least one frequency in a range of about 0.1 GHz to about 90 GHz includes at least one frequency in a range of 0.5 to 1 GHz or 2.45 to 90 GHz.

In some embodiments, an optical stack includes the optical film 100 and further includes an optical layer 210 (resp., 210') disposed on and substantially coextensive with the optical film 100. For example, the optical layer 210 (resp., 210') may cover at least 60 percent or at least 80 percent of an area of the optical film 100 and/or the optical film 100 may cover at least 60 percent or at least 80 percent of an area of the optical layer 210 (resp., 210'). The optical layer 210 or 210' can be a colored layer (e.g., an ink coating) and/or an optical diffuser, for example. A colored layer can be used to provide a desired color in reflection (e.g., to produce a colored metallic appearance) and an optically diffusive layer can optionally be included to provide a more diffuse reflectance which may be desired in some applications. In some embodiments, the optical layer 210 or 210' is substantially optically absorptive (e.g., an optical absorbance of at least 20% or at least 40% for substantially normally incident light for at least one polarization state) for at least one visible wavelength (e.g., a wavelength in a range of 400 nm to 700 nm). For example, the optical layer 210 or 210' can be a colored layer absorbing more for some wavelengths than for others.

Figure 27:
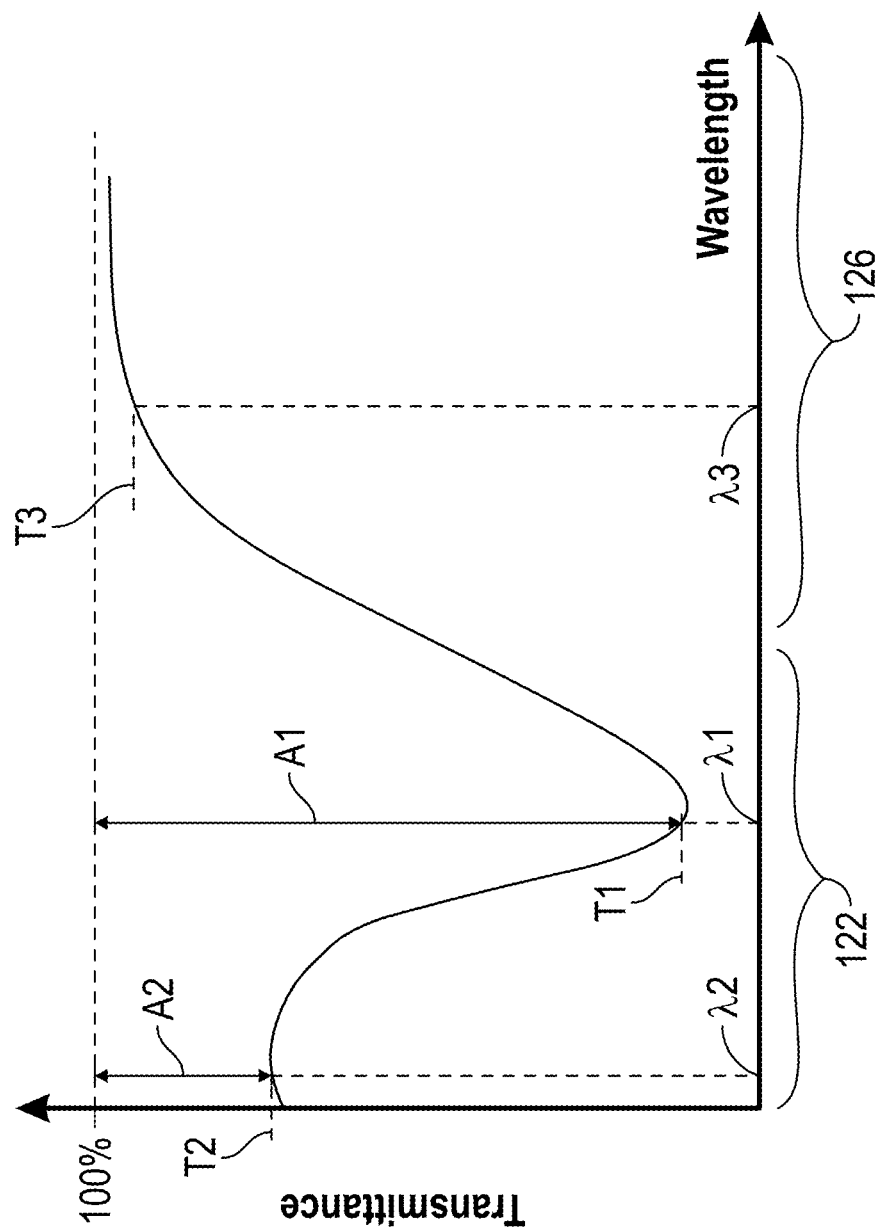
FIG. 27 is a schematic plot of transmittance through an illustrative optical layer.

FIG. 27 is a schematic plot of transmittance through an optical layer (e.g., 210 or 210'), according to some embodiments, for substantially normally incident light for at least one polarization state. The transmittance can be substantially the same for orthogonal polarization states, for example. The absorbance can be approximated as 100% minus the transmittance (neglecting Fresnel reflections at surfaces). In some embodiments, for substantially normally incident light and for the at least one polarization state, an optical absorption of the optical layer is at least 20%, or at least 30%, or at least 40% higher for a first wavelength (e.g., optical absorption A1 at the first wavelength 21) in the first wavelength range 122 than for a second wavelength (e.g., optical absorption A2 at the second wavelength 22) in the first wavelength range 122. The optical transmittance T1 and T2 at the first and second wavelengths 21 and 22, respectively, for substantially normally incident light and for at least the first polarization state are illustrated. In some embodiments, T2-T1 is at least 20%, or at least 30%, or at least 40%. In some embodiments, for substantially normally incident light and for the at least one polarization state: an optical transmittance T2 of the optical layer is greater than about 70% for the second wavelength 22, and the optical absorption A1 of the optical layer is greater than about 40% for the first wavelength A1. In some embodiments, the optical layer has an optical transmittance T3 at a third wavelength 23 in the second wavelength range 126. In some embodiments, the third wavelength 23 is about 850 nm or about 940 nm. The optical layer may be patterned (e.g., including optically absorptive ink printed in a pattern). In this case, the optical transmittance and the optical absorption of the layer refers to the optical transmittance and optical absorption in regions where the material of the layer is present.

Figure 28:
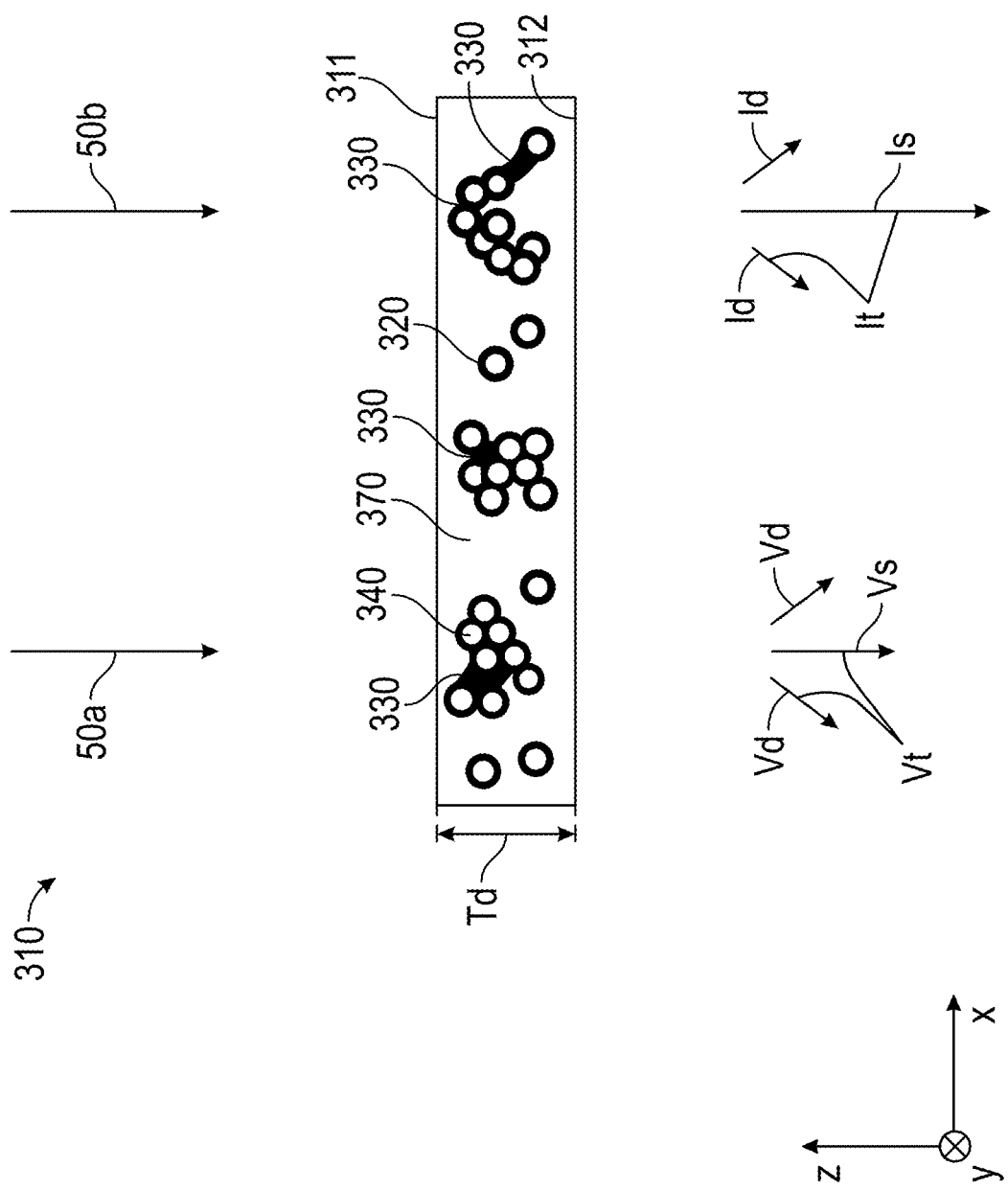
FIG. 28 is a schematic cross-sectional view of an illustrative optical layer.

FIG. 28 is a schematic cross-sectional view of an optical layer 310 (e.g., corresponding to optical layer 210 or 210'), according to some embodiments. The optical layer 310 has opposing first and second major surfaces 311 and 312 and includes a plurality of particles 320 dispersed between and across the first and second major surfaces 311 and 312. The optical layer 310, which may alternatively be referred to as an optically diffusive layer, includes a polymeric material 330 bonding the particles to each other to form a plurality of particle aggregates 340 defining a plurality of voids 370 therebetween. In some embodiments, the plurality of particles 320 is a plurality of nanoparticles and the plurality of particle aggregates 340 is a plurality of nanoparticle aggregates. In some embodiments, the particles 320 are or include silica. For example, the particles 20 can be silica nanoparticles. In some embodiments, in a plane of a cross-section of the optical layer (e.g., the x-z plane in the illustrated cross-section) in a thickness direction of the optical layer 310: the nanoparticles 320 have an average size between about 20 nm and about 150 nm; an average size of the nanoparticle aggregates 340 is between about 100 nm and about 1000 nm; and the voids occupy from about 5% to about 50% of an area of the plane of the cross-section. Such optically diffusive layers have been found to provide a substantially higher degree of specular transmittance in an infrared range than in a visible range, according to some embodiments. Alternatively, or in addition, the optically diffusive layer can provide a substantially higher degree of diffuse transmittance in a visible range than in an infrared range, according to some embodiments. In some embodiments, the optical layer 310 has an average thickness Td between about 0.1 microns and about 20 microns, or between about 1 microns and about 20 microns, or between about 1.5 microns and about 10 microns, or between about 2 microns and about 8 microns.

In some embodiments, the optical layer 310 is formed by coating a mixture of the particles, monomer and a solvent, and then curing and drying the mixture. The monomer cures into a polymeric binder (polymeric material 330) bonding aggregates of the particles together and the solvent evaporates forming voids between the aggregates. The solvent can evaporate at least partially during curing and/or a subsequent drying step can be used to complete evaporation of the solvent. In some embodiments, the curing and drying includes a pre-cure step, then a drying step, and then a post-cure step. In some embodiments, the monomer is ultraviolet (UV) curable and a photoinitiator is included in the mixture. The size of the aggregates can be adjusted by changing the UV power used to cure the monomer with a higher power generally resulting in smaller aggregate size. It has been found that a relatively low amount of photoinitiator with a relative high UV power results in small aggregate size and a non-fragile layer while a higher amount of photoinitiator can result in a more fragile layer. The void fraction can be adjusted by changing the amount of solvent used in the mixture with a higher solvent loading generally resulting in a higher void fraction. In some embodiments, the mixture includes about 20 to about 60 weight percent solids. In some embodiments, the polymeric material 330 is or includes a radiation cured (e.g., UV cured) polymer. In some embodiments, the polymeric material 330 is or includes an acrylate. In some embodiments, the polymeric material 330 is or includes pentaerythritol triacrylate. Related optically diffusive layers are described in co-pending U.S. Appl. No. 63/021,751 filed May 8, 2020 and titled "Optical Films and Stacks Including Optically Diffusive Layer".

FIG. 28 schematically illustrates light 50a and 50b substantially normally incident on the optical layer 310. The light 50a has a wavelength in a visible range (e.g., corresponding to wavelength range 122) and the light 50b has a wavelength an infrared range (e.g., corresponding to wavelength range 126). For the light 50a in the visible wavelength range, the optical layer 310 has an average specular transmittance Vs, an average diffuse transmittance Vd and an average total transmittance Vt (Vt=Vs+Vd). For the light 50b in the near infrared wavelength range, the optical layer 310 has an average specular transmittance Is, an average diffuse transmittance Id and an average total transmittance It (It=Is+Id). In some embodiments, for substantially normally incident light 50, 50a, 50b and a visible wavelength range from about 450 nm to about 650 nm and an infrared wavelength range from about 930 nm to about 970 nm: in the visible wavelength range, the optical layer 310 has an average specular transmittance Vs; and in the infrared wavelength range, the optical layer 310 has an average total transmittance It and an average specular transmittance Is. In some embodiments, Is/It≥0.6 and Is/Vs≥2.5. In some embodiments, Is/Vs≥ 3. In some embodiments, It/Vt>1, or It/Vt>2, or It/Vt>3. In some embodiments, Is/It≥0.7. If the polarization state of the incident light is not specified, it may be assumed that the incident light is unpolarized unless the context clearly indicates differently.

A high diffuse transmittance (e.g., high Vd) corresponds to a high optical haze. In some embodiments, the optical layer 310 has an optical haze of at least about 5%, or at least about 10%, or at least about 20%, or at least about 30%. The optical haze is a ratio of diffuse luminous transmittance to total luminous transmittance and can be determined according to the ASTM D1003-13 test standard, for example.

Figure 29:
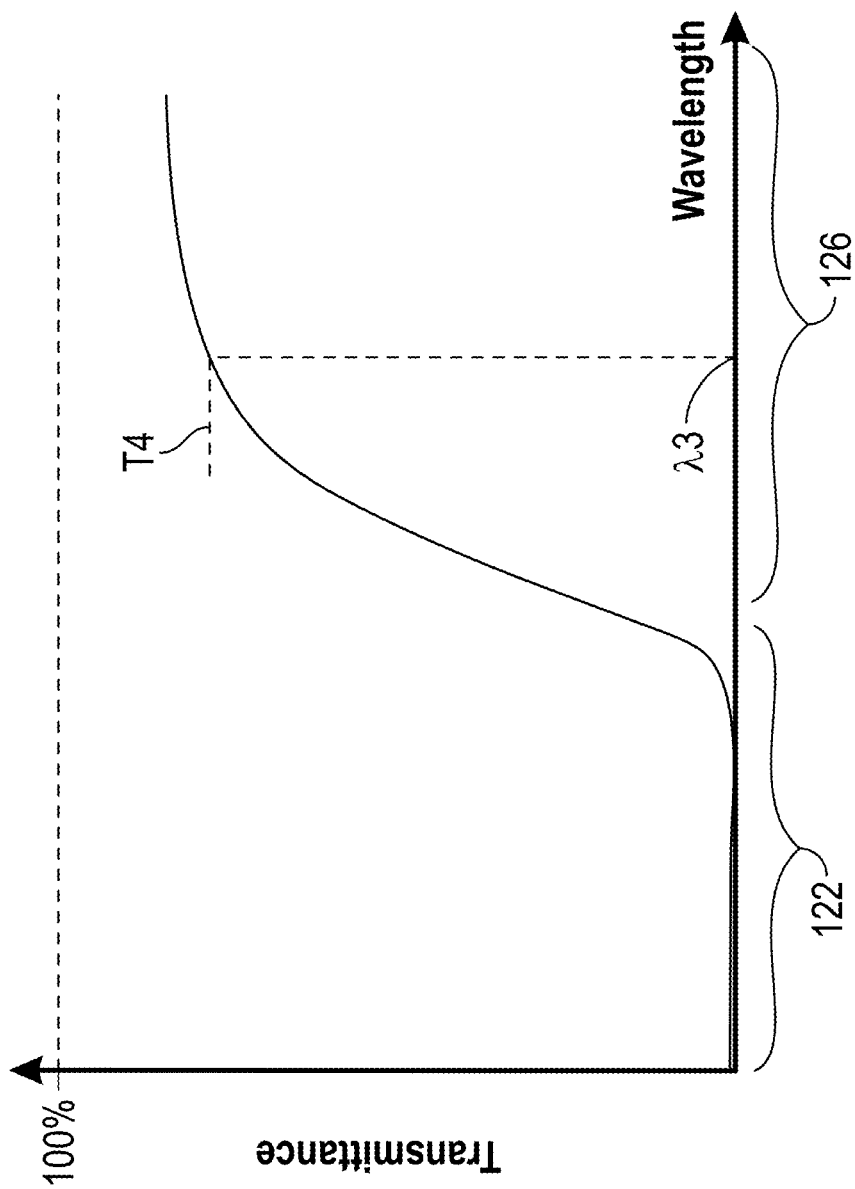
FIG. 29 is a schematic plot of optical transmittance through an illustrative optical stack.

FIG. 29 is a schematic plot of transmittance through an optical stack 200, according to some embodiments, for substantially normally incident light for at least one polarization state. The optical stack can include an optical film described elsewhere herein and an optical layer as described in FIG. 27, for example. The transmittance may have variations in the near infrared region not shown in the schematic illustration of FIG. 29 (see, e.g., FIG. 4). In some embodiments, the optical stack 200 has an optical transmittance T4 for substantially normally incident light and for the at least one polarization state of greater than about 60% or greater than about 70% or greater than about 75% for a third wavelength 23 in the second wavelength range 126.

The optical stack 200 can have a transmission, a reflection, and/or a loss tangent in any of the ranges described elsewhere for the optical film 100 for at least one frequency in a range of about 0.1 GHz to about 90 GHz. For example, in some embodiments, for at least one frequency in a range of about 0.1 GHz to about 90 GHz and for substantially normally incident radiation, the optical stack 200 transmits at least about 95%, or at least about 97%, or at least about 98%, or at least about 99% of the incident radiation. As another example, in some embodiments, for at least one frequency in a range of about 0.1 GHz to about 90 GHz: a dielectric loss tangent of the optical stack 200 is less than about 0.02; and for substantially normally incident radiation, the optical stack reflects less than about 5%, or less than about 2%, or less than about 1% of the incident radiation. As still another example, in some embodiments, for at least one frequency in a range of about 0.1 GHz to about 90 GHz: a dielectric loss tangent of the optical stack is less than about 0.02; and for substantially normally incident radiation, the optical stack transmits at least about 95% of the incident radiation. The dielectric loss tangent and transmission can be in any of the ranges described elsewhere. The reflection and transmission of the optical stack 200 can be determined for the radiation incident on the optical film 100 or incident on the optical layer 210 or 210' if included.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A housing for an electronic device, the housing comprising an optical film bonded to a rigid optically transparent substrate, an optical transmittance of the optical film for substantially normally incident light and for at least one polarization state comprising a band edge separating first and second wavelength ranges, the first wavelength range extending from about 400 nm to about 700 nm, the second wavelength range being at least about 100 nm wide and disposed between about 800 nm and about 1100 nm, such that for substantially normally incident light and for the at least one polarization state:

an average optical reflectance of the optical film is greater than about 90% in the first wavelength range; and an average optical transmittance of the optical film is greater than about 80% in the second wavelength range, wherein a best linear fit to the band edge correlating the optical transmittance of the optical film to wavelength at least across a wavelength range where the optical transmittance of the optical film increases from about 10% to about 70% has a slope that is greater than about 2%/nm, and wherein for at least one frequency in a range of about 0.1 GHz to about 90 GHz and for substantially normally incident radiation, the optical film transmits at least about 95% of the incident radiation.

2. The housing of claim 1, wherein for at least one frequency in a range of about 0.1 GHz to about 90 GHz, a dielectric loss tangent of the optical film is less than about 0.02.

3. The housing of claim 1, wherein for at least one frequency in a range of about 0.1 GHz to about 90 GHz, a real part of a dielectric constant of the optical film is no more than about 4.

4. The housing of claim 1, wherein the optical film comprises a plurality of polymeric layers arranged along at least a portion of a thickness of the optical film and sequentially numbered from 1 to N, N an integer greater than about 100, the plurality of polymeric layers comprising a polymeric end layer at each end thereof, a plot of an average layer thickness versus a layer number of the plurality of polymeric layers comprising a first knee region separating a left region comprising at least N1 sequentially arranged polymeric layers, N1 an integer greater than about 50, where the polymeric layers have lower layer numbers, from a middle region comprising at least N2 sequentially arranged polymeric layers, N2 an integer greater than about 10, where the polymeric layers have higher layer numbers, such that a linear fit to the at least N1 sequentially arranged polymeric layers in the left region has a positive linear slope having a magnitude of greater than about 0.04 nm per layer number with an r-squared value of greater than about 0.8, and a linear fit to the at least N2 sequentially arranged polymeric layers in the middle region has a negative linear slope having a magnitude of greater than about 0.05 nm per layer number with an r-squared value of greater than about 0.8.

5. The housing of claim 1, wherein the at least one polarization state comprises orthogonal first and second polarization states.

6. The housing of claim 1, wherein the at least one polarization state comprises a first polarization state and for substantially normally incident light having a second polarization state orthogonal to the first polarization state, an average optical transmittance of the optical film is greater than about 80% in each of the first and second wavelength ranges.

7. The housing of claim 1, wherein the at least one frequency in a range of about 0.1 GHz to about 90 GHz comprises at least one frequency in a 5G band as defined by the 3GPP Release 15 or at least one frequency in a range of about 64 GHz to about 71 GHz.

8. The housing of claim 1, wherein an optical stack comprises the optical film and further comprises an optical layer disposed on and substantially coextensive with the optical film, the optical layer being substantially optically absorptive for at least one visible wavelength.

* * * * *